US012659532B1

(12) United States Patent
Eisenbacher et al.

(10) Patent No.: US 12,659,532 B1
(45) Date of Patent: Jun. 16, 2026

(54) STREAMING DIGITAL RIGHTS MANAGEMENT PROTECTED MEDIA CONTENT VIA WebRTC

(71) Applicant: EZDRM, Inc., Rye Brook, NY (US)

(72) Inventors: David C. Eisenbacher, Ossining, NY (US); Olga Kornienko, Yonkers, NY (US)

(73) Assignee: EZDRM, Inc.

( * ) Notice: Subject to any disclaimer, the term of this patent is extended or adjusted under 35 U.S.C. 154(b) by 350 days.

(21) Appl. No.: 18/422,599

(22) Filed: Jan. 25, 2024

Related U.S. Application Data

(60) Provisional application No. 63/481,452, filed on Jan. 25, 2023.

(51) Int. Cl.
*H04N 21/254* (2011.01)
*H04N 21/2347* (2011.01)
*H04N 21/2368* (2011.01)

(52) U.S. Cl.
CPC ..... *H04N 21/2541* (2013.01); *H04N 21/2347* (2013.01); *H04N 21/2368* (2013.01)

(58) Field of Classification Search
CPC ........................ H04N 21/4627; H04L 65/1108
See application file for complete search history.

(56) References Cited

U.S. PATENT DOCUMENTS

| | | | |
|---|---|---|---|
| 2016/0192029 A1 | 6/2016 | Bergstrom | |
| 2018/0324303 A1 | 11/2018 | Boehme | |
| 2019/0320014 A1* | 10/2019 | Allen | H04N 21/6405 |
| 2020/0014988 A1 | 1/2020 | Navali et al. | |
| 2022/0007083 A1* | 1/2022 | Lin | H04N 21/23892 |
| 2023/0216947 A1* | 7/2023 | Bernardi | H04L 67/10 |
| | | | 713/150 |
| 2023/0353609 A1* | 11/2023 | Bouazizi | H04L 63/0428 |
| 2024/0064190 A1* | 2/2024 | Yang | H04L 65/1069 |
| 2024/0163321 A1 | 5/2024 | Macaulay et al. | |
| 2024/0430319 A1* | 12/2024 | Allen | H04L 65/612 |
| 2025/0036722 A1* | 1/2025 | Ivanov | G06F 21/1012 |
| 2025/0287051 A1* | 9/2025 | Schuler | H04N 21/2347 |

OTHER PUBLICATIONS

Castlabs DRM for WebRTC, Jean Navarrete, Mar. 14, 2023, https://castlabs.com/blog/webrtc-drm-end-to-end-security/ (Year: 2023).*

* cited by examiner

*Primary Examiner* — Frank Johnson
(74) *Attorney, Agent, or Firm* — AEON Law, PLLC; Adam L.K. Philipp; James Namiki

(57) ABSTRACT

The disclosed embodiments relate to systems and methods, which among other things, acquire a digital rights management (DRM)-protected media content frame. The systems and methods package the DRM-protected media content frame to disguise the DRM-protected media content frame as a WebRTC-compliant video frame by including the DRM-protected media content frame as a payload for a WebRTC-compliant video frame container that includes a WebRTC-compliant coder and decoder (codec) header to produce a WebRTC-compliant video frame container package. The systems and methods may then transmit through a WebRTC video channel the WebRTC-compliant video frame container package.

20 Claims, 13 Drawing Sheets

500

200

202

Acquire digital rights management (DRM)-protected media content data

204

Convert the DRM-protected media content data into a plurality of transport blocks for transmission through one or more WebRTC data channels

206

Transmit through the one or more WebRTC data channels the plurality of transport blocks

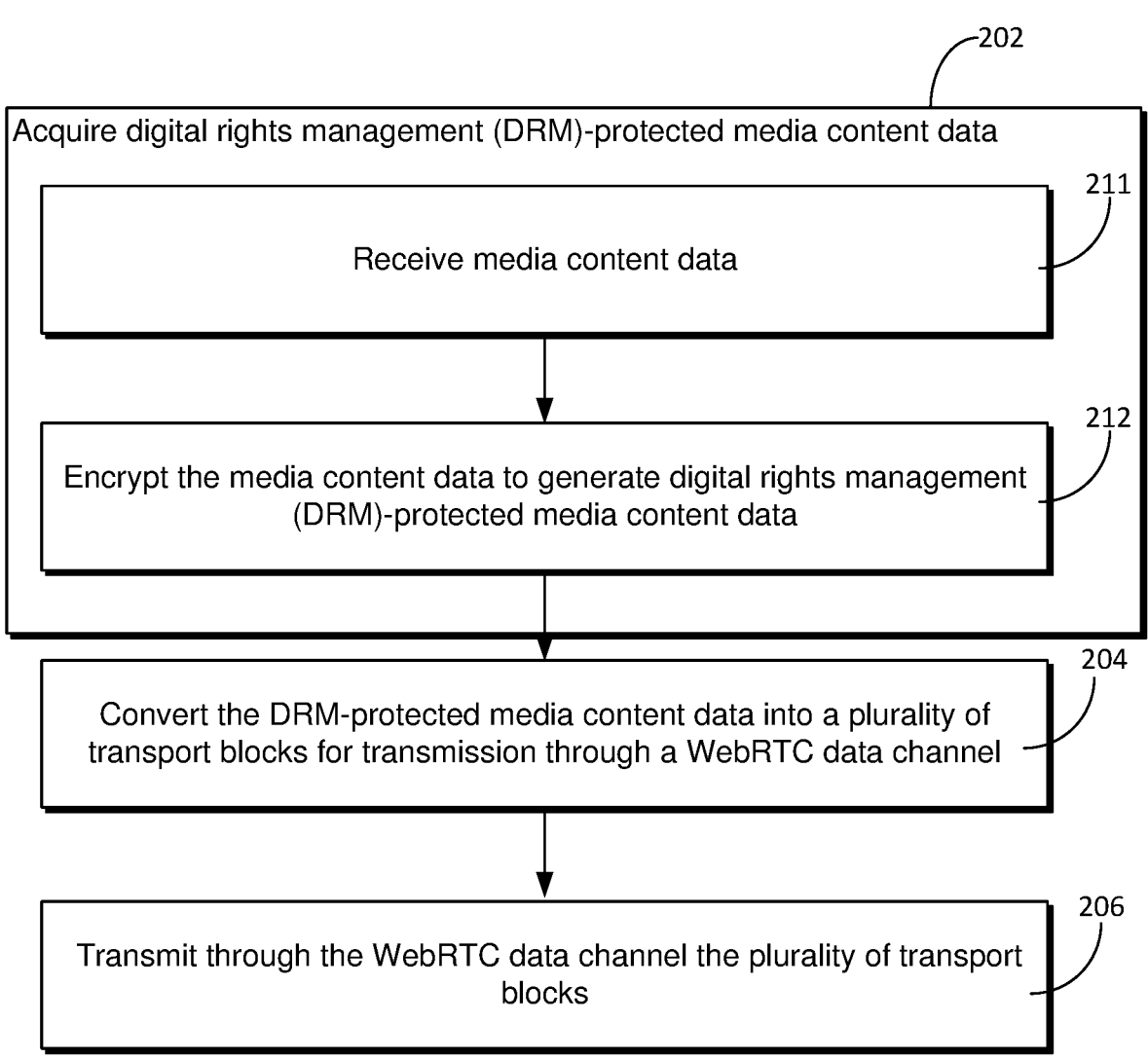

Acquire digital rights management (DRM)-protected media content data ⌐202

Receive media content data ⌐211

Encrypt the media content data to generate digital rights management (DRM)-protected media content data ⌐212

Convert the DRM-protected media content data into a plurality of transport blocks for transmission through a WebRTC data channel ⌐204

Transmit through the WebRTC data channel the plurality of transport blocks ⌐206

Acquire digital rights management (DRM)-protected media content data

222

Receive digital rights management (DRM)-protected media content data

224

Convert the DRM-protected media content data into a plurality of transport blocks for transmission through a WebRTC data channel

226

Transmit through the WebRTC data channel the plurality of transport blocks

400

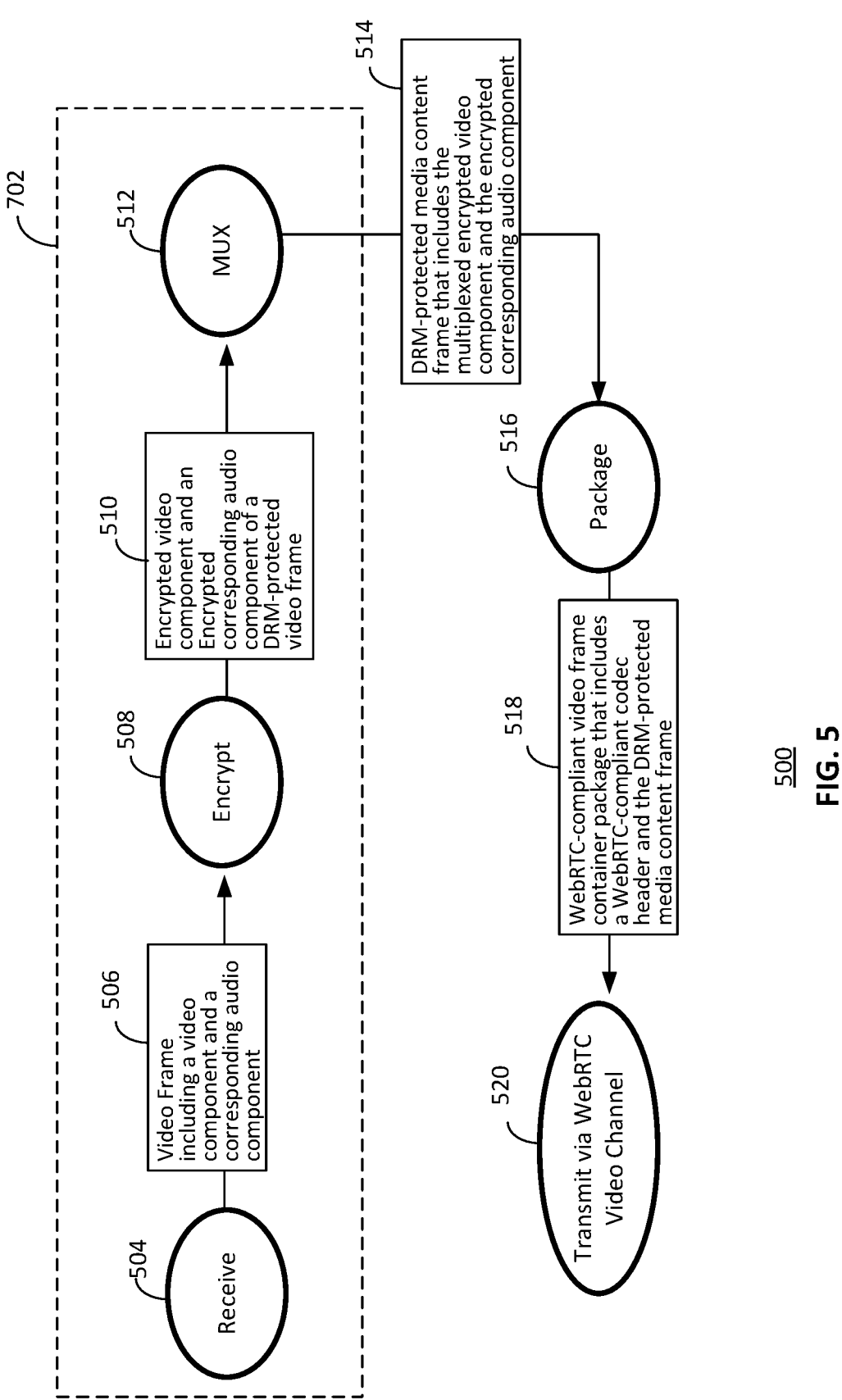

702

504 Receive

506 Video Frame including a video component and a corresponding audio component

508 Encrypt

510 Encrypted video component and an Encrypted corresponding audio component of a DRM-protected video frame

512 MUX

514 DRM-protected media content frame that includes the multiplexed encrypted video component and the encrypted corresponding audio component 516 Package 518 WebRTC-compliant video frame container package that includes a WebRTC-compliant codec header and the DRM-protected media content frame 520 Transmit via WebRTC Video Channel

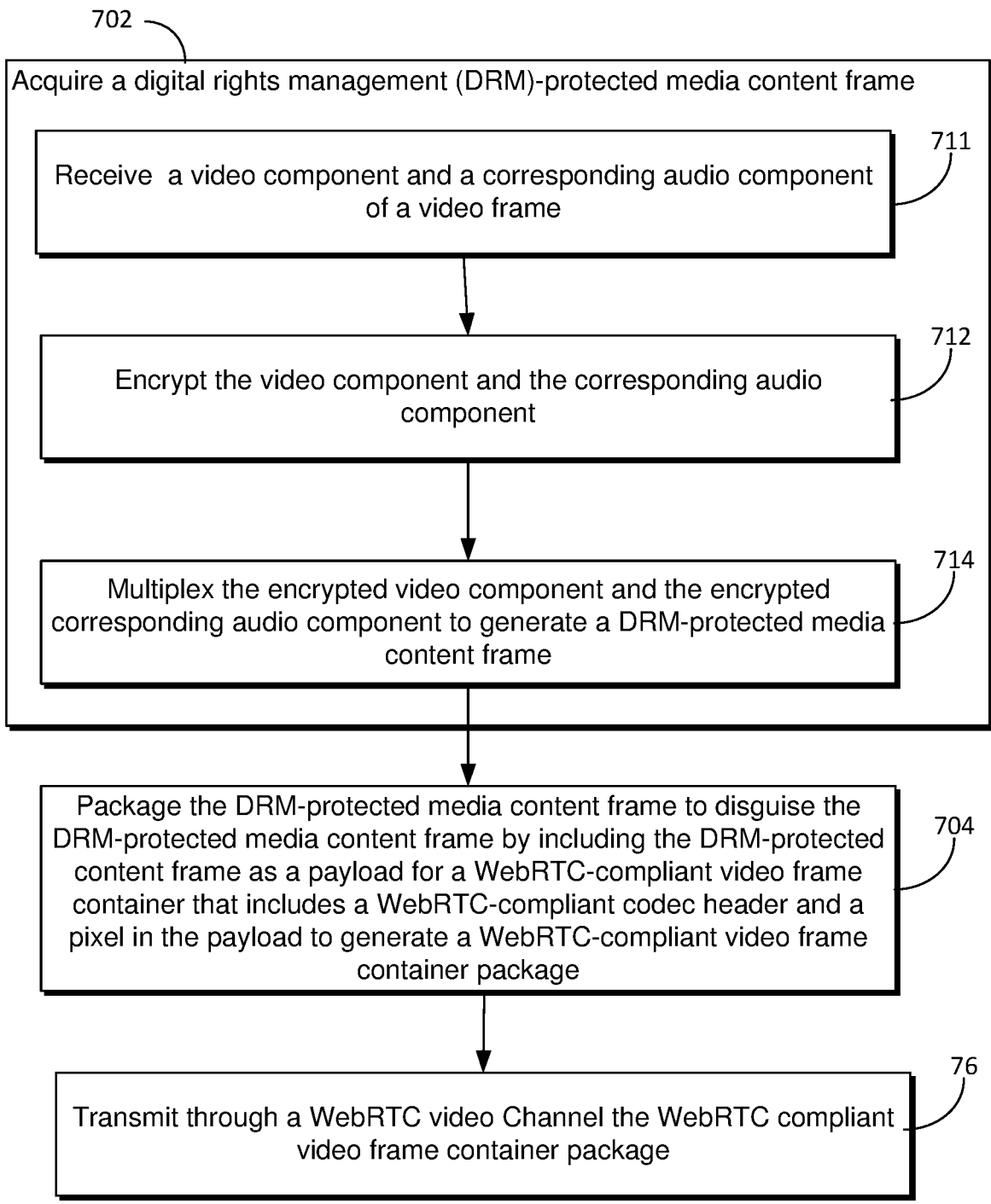

702

Acquire a digital rights management (DRM)-protected media content frame

Receive a video component and a corresponding audio component of a video frame

711

Encrypt the video component and the corresponding audio component

712

Multiplex the encrypted video component and the encrypted corresponding audio component to generate a DRM-protected media content frame

714

Package the DRM-protected media content frame to disguise the DRM-protected media content frame by including the DRM-protected content frame as a payload for a WebRTC-compliant video frame container that includes a WebRTC-compliant codec header and a pixel in the payload to generate a WebRTC-compliant video frame container package

704

Transmit through a WebRTC video Channel the WebRTC compliant video frame container package

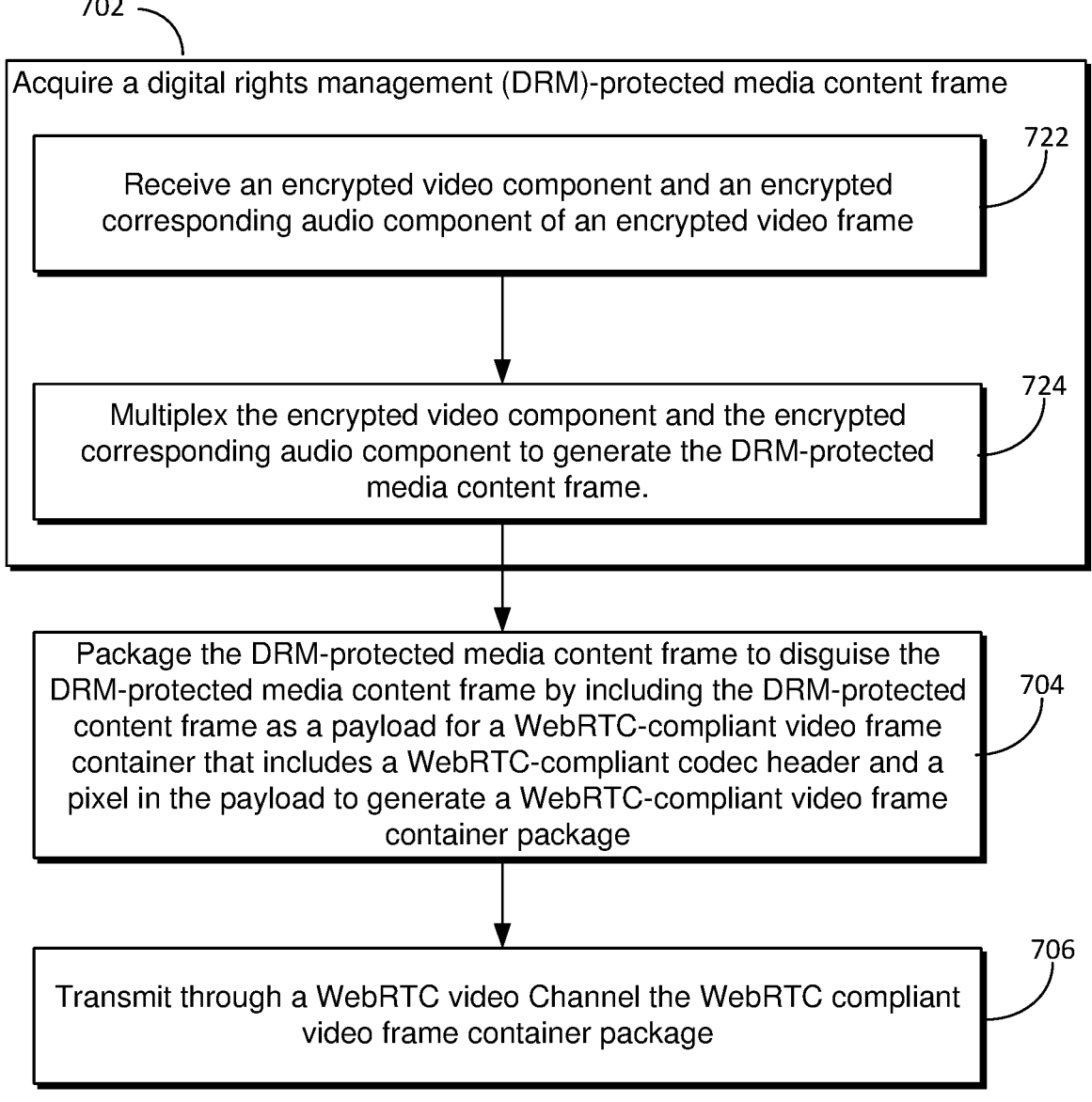

702

Acquire a digital rights management (DRM)-protected media content frame

722

Receive an encrypted video component and an encrypted corresponding audio component of an encrypted video frame

724

Multiplex the encrypted video component and the encrypted corresponding audio component to generate the DRM-protected media content frame.

704

Package the DRM-protected media content frame to disguise the DRM-protected media content frame by including the DRM-protected content frame as a payload for a WebRTC-compliant video frame container that includes a WebRTC-compliant codec header and a pixel in the payload to generate a WebRTC-compliant video frame container package

706

Transmit through a WebRTC video Channel the WebRTC compliant video frame container package

FIG. 7C

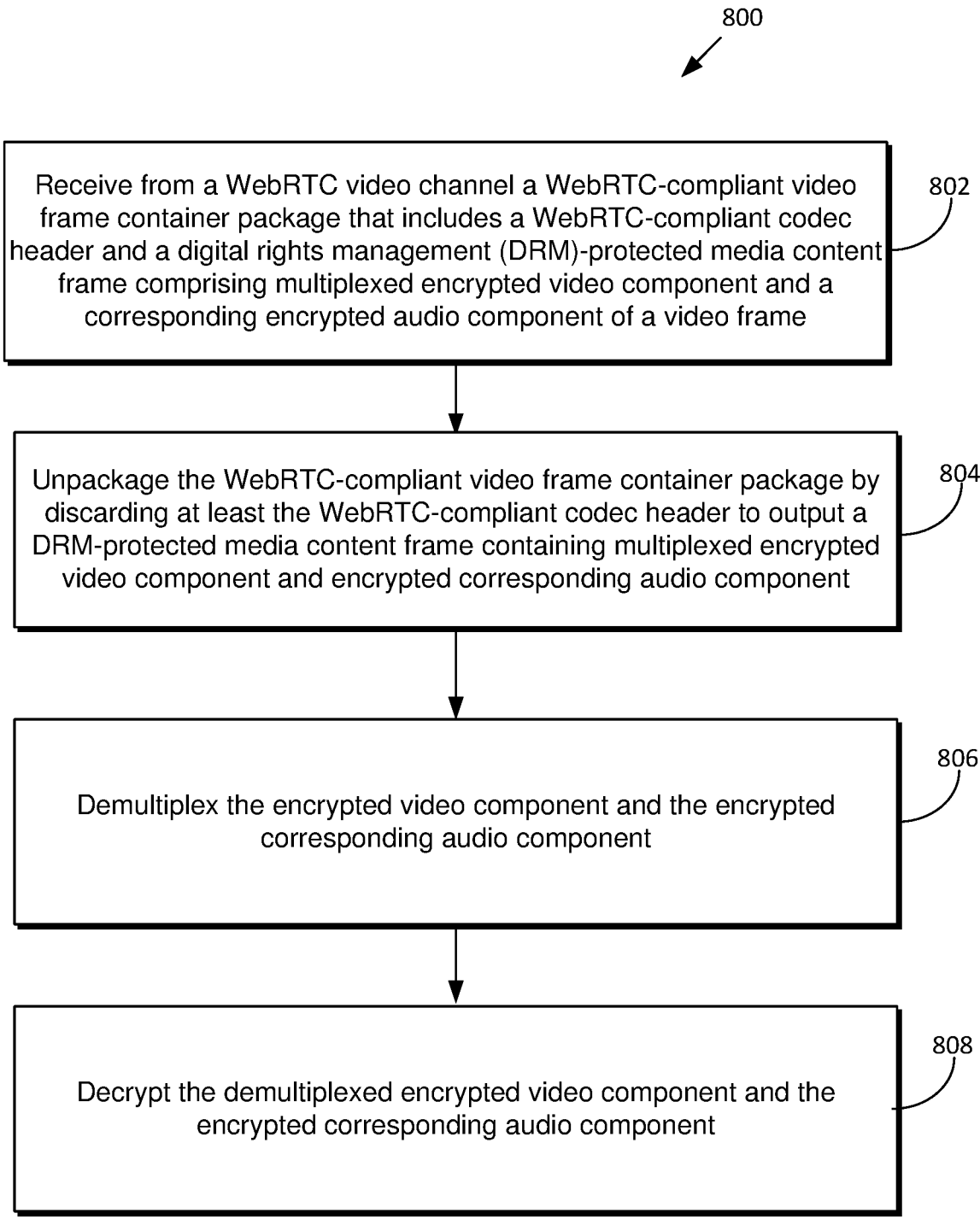

800

Receive from a WebRTC video channel a WebRTC-compliant video frame container package that includes a WebRTC-compliant codec header and a digital rights management (DRM)-protected media content frame comprising multiplexed encrypted video component and a corresponding encrypted audio component of a video frame

802

Unpackage the WebRTC-compliant video frame container package by discarding at least the WebRTC-compliant codec header to output a DRM-protected media content frame containing multiplexed encrypted video component and encrypted corresponding audio component

804

Demultiplex the encrypted video component and the encrypted corresponding audio component

806

Decrypt the demultiplexed encrypted video component and the encrypted corresponding audio component

STREAMING DIGITAL RIGHTS MANAGEMENT PROTECTED MEDIA CONTENT VIA WebRTC

CROSS REFERENCE TO RELATED APPLICATION

This application claims priority to U.S. Provisional Patent Application Ser. No. 63/481,452, filed on Jan. 25, 2023, which is incorporated herein by reference in its entirety.

BACKGROUND

Field of the Embodiments

The present disclosure generally relates to electronic communication and, more particularly, to streaming of secured media content.

Description of Related Art

There are currently a number of media streaming formats available for streaming media content such as video, audio, image, and textual content from a variety of sources such as a camera, a mobile phone, a tablet computer, a video on demand (VOD) source, and so forth to one or more destinations (e.g., personal computing device, a tablet computer, mobile phone, etc.). Among the most popular streaming formats that are in current use are HTTP Live Streaming (or simply "HLS"), Moving Picture Experts Group (MPEG)-Dynamic Adaptive Streaming over HTTP (or simply "MPEG-DASH"), and Microsoft Smooth Streaming (or simply "MSS"). All three of these formats are Transport Control Protocol (TCP) based protocols that favor reliability over speed. That is, TCP-based protocols such as HLS, MPEG-DASH, and MSS employ "handshake" processes to ensure that data packets that are streamed are successfully delivered to their destinations. A handshake protocol typically requires the media content source and the destination to communicate during content streaming to ensure that each data packet successfully arrives at the destination, and if not, a request is sent back to the source for retransmission of the missing packet. As a result, a certain amount of latency is inherently associated with TCP-based protocols.

These TCP-based formats have proven to be compatible for streaming highly secured digital rights management (DRM)-protected media content (e.g., video, audio, image, or text content), which are typically encrypted to ensure privacy and prevent piracy. However, although these TCP-based streaming formats are highly reliable for streaming media content, they suffer from significant latency issues due to the handshake processes they employ.

An alternative to TCP-based streaming protocols is User Datagram Protocol (UDP)-based streaming standards such as Web Real-Time Communication (or simply "WebRTC"). WebRTC is a technology that allows peer-to-peer file sharing in real-time with minimal latency. In particular, streaming standards such as WebRTC does not employ a handshake protocol such as those employed by TCP-based streaming standards and has, therefore, relatively low latency and is much faster than TCP-based technology. WebRTC is commonly used for video chats and meetings on various video calling platforms such as ZOOM, MICROSOFT TEAMS, SLACK, GOOGLE MEET, and so forth.

One drawback with respect to WebRTC is that it does not currently permit streaming (e.g., peer-to-peer/multi-user) of DRM-protected media content that is encrypted through WebRTC's media channels (e.g., video, audio, images, and text channels). That is, to direct media content to the appropriate WebRTC's media channel, the media content must typically be read. Thus, media content that is DRM-protected is not in a format that is conducive for transmission through WebRTC's media channels since DRM-protected media content is typically encrypted and not readable. As a result, WebRTC does not currently allow for the streaming of highly secured DRM-protected media content.

BRIEF DESCRIPTION OF THE DRAWINGS

The present disclosure is illustrated by way of example, and not limitation, in the figures of the accompanying drawings, in which like reference numerals indicate similar elements and in which:

FIG. 2B is a high-level logic flowchart of a process depicting an alternate implementation of the acquisition operation 202 of FIG. 2A;

FIG. 5 illustrates inputs/outputs of various operations of an example flow process in accordance with some example embodiments;

FIG. 7B is a high-level logic flowchart of a process depicting an alternate implementation of the acquisition operation 702 of FIG. 7A;

FIG. 7C is a high-level logic flowchart of a process depicting an alternate implementation of the acquisition operation 702 of FIG. 7A;

FIG. 8 is a high-level logic flowchart of a process, e.g., operation flow 300, according to some embodiments.

DETAILED DESCRIPTION

Figure 1:
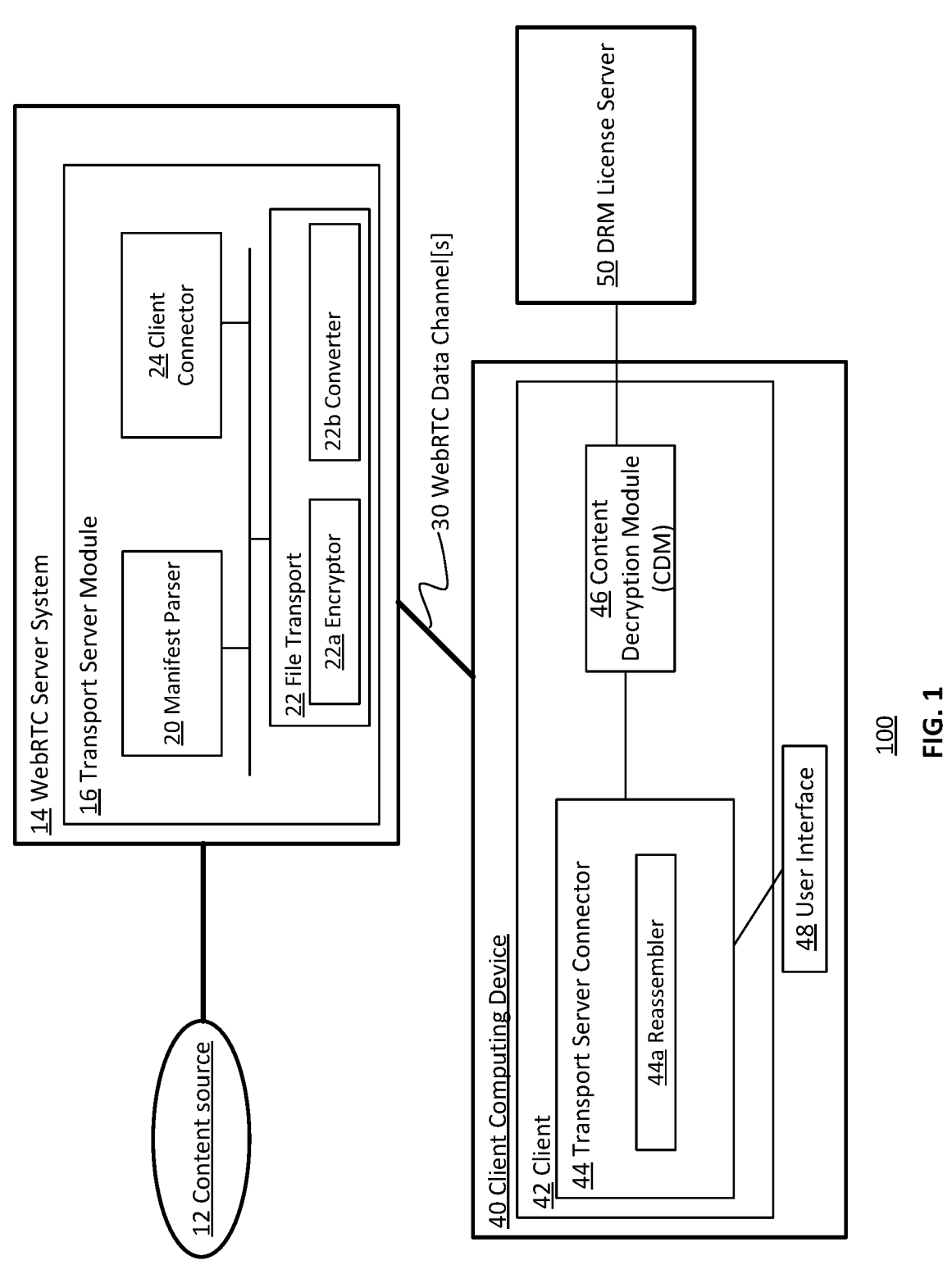
FIG. 1 is a high-level block diagram of an example environment in which DRM-protected media content is transmitted from a content source to a content destination via one or more WebRTC data channels in accordance with some example embodiments.

In the following description, certain specific details are set forth in order to provide a thorough understanding of various embodiments of the disclosure. However, upon reviewing this disclosure, one skilled in the art will understand that the disclosure may be practiced without many of these details. In other instances, well-known structures/apparatus, systems, and methods associated with computers, wireless devices, networks/cloud-based computing, and SaaS, have not been described in detail to avoid unnecessarily obscuring the descriptions of the embodiments of the disclosure.

Throughout various portions of the following description, the embodiments of the present disclosure are described in the context of application to specific examples as presented. However, these examples are not intended to be limited unless otherwise expressly stated. As will be understood by one skilled in the art after reviewing this disclosure, various embodiments of the present disclosure may have a wide variety of applications in other contexts and fields.

The term, computer-readable medium or media, does not include "transitory waves or signals." The drawings submitted herewith include example information depicted for illustrative purposes and are not intended to be limiting unless otherwise indicated.

According to some embodiments of the present disclosure, WebRTC data channel methods and systems are disclosed herein for securely streaming DRM-protected media content via one or more WebRTC data channels. For these embodiments, the WebRTC data channel methods and systems may, in brief, acquire DRM-protected media content data, which may be encrypted media content data, chop the encrypted media content data into relatively small blocks (e.g., 16 kilobytes or less in some cases, which is the current maximum message size for a WebRTC data channel) of encrypted media content data that a WebRTC data channel will accept, and send the relatively small blocks of encrypted media content data through the WebRTC data channel to the destination (e.g., a mobile computing device, a tablet computer, a lap or desktop computer, etc.) rather than sending the media content data through one of the media channels (e.g., video channel, audio channel, etc.).

Various approaches may be employed to acquire DRM-protected (e.g., encrypted) media content data in various alternative embodiments. For example, in some embodiments, the DRM-protected (e.g., encrypted) media content data may be acquired by first receiving unencrypted media content data from a media content source, such as a camera, a mobile phone, a tablet computer, a video on demand (VOD) source, and so forth. Upon receiving the unencrypted media content data, the unencrypted media content data may then be encrypted to generate encrypted media content data, which will also be referred to herein as "DRM-protected media content data," The DRM-protected media content data may then be chopped into small blocks (hereinafter "transport blocks") of encrypted media content data and transmitted through one or more WebRTC data channels.

In some alternative embodiments, and as will be further described herein, the media content data that may be received may already have been encrypted as DRM-protected (e.g., encrypted) media content data from a content source. Upon receiving the DRM-protected media content data, the DRM-protected media content data may be chopped into small blocks (i.e., transport blocks) of encrypted media content data for transmission through the WebRTC data channel. Note that in the following, the terms "DRM-protected media content data" and "encrypted media content data" may be used interchangeably and may, therefore, be synonymous unless indicated otherwise.

In various embodiments, the media content data that may be received may comprise large chunks or blocks of encrypted or unencrypted media content data. For example, if the media content to be streamed is video content, then the encrypted or unencrypted media content data may comprise encrypted or unencrypted video segments (e.g., each segment may be one or more megabytes in size and in some cases, may include multiple video frames). On the other hand, if the media content data to be received is image, audio, or text content data, for example, then the encrypted or unencrypted media content data may comprise encrypted or unencrypted image, audio, or text files that are fairly large (e.g., each file may be hundreds of kilobytes to one or more megabytes in size).

WebRTC data channels, unlike WebRTC media channels (e.g., WebRTC video channel, WebRTC audio channel, WebRTC image channel, etc.) permit transmission of encrypted media content. However, WebRTC currently allows only data blocks of 16 kilobytes or less to be transmitted through a WebRTC data channel. By chopping encrypted media content data into relatively small blocks that are sized to be acceptable by a WebRTC data channel and sending the relatively small blocks of encrypted media content data through the WebRTC data channel, the privacy of the media content data may be maintained with minimal latency that commonly occurs when solely using TCP protocols such as HLS, MPEG-DASH, and MSS to stream media content. For purposes of the following description, these relatively small blocks of encrypted media content data that may be transmitted through a WebRTC data channel will be referred to herein as "transport blocks." Note that although the current limit on the size of the data blocks that can be sent through a WebRTC data channel is 16 kilobytes, it is possible that in the future, larger-sized data blocks may be transmitted through a WebRTC data channel. Thus, it is contemplated that the transport blocks that are transmitted through a WebRTC data channel, via the WebRTC data channel methods and systems, may each contain an amount of data that meets whatever maximum allowed data size for a WebRTC data channel.

In various embodiments, if the encrypted (e.g., DRM-protected) media content data to be transmitted via a WebRTC data channel is encrypted video content data (e.g., streaming video), then two WebRTC data channels may be employed to transmit the encrypted video content data. That is, video content data, such as a video frame that may comprise a video component and a corresponding audio component, are typically played together synchronously during playback, but are commonly transmitted as two different streams. Thus, in various embodiments, the encrypted video component of a DRM-protected video frame may be transmitted through a first WebRTC data channel in the form of a first set of one or more transport blocks, while the encrypted corresponding audio component of the DRM-protected video frame may be transmitted through a second WebRTC data channel in the form of a second set of one or more transport blocks as will be further described herein.

FIG. 1 is a high-level block diagram of an example environment 100 in which media content data, which may or may not be DRM-protected (e.g., encrypted), is transmitted from a content source 12 (e.g., a video-on-demand (VOD) source, a mobile phone, a camera, etc.) to a content destination (e.g., a client computing device 40 such as a desktop computer, a laptop computer, a tablet computer, a mobile device, and so forth) via a WebRTC server system 14 and one or more WebRTC data channels 30 with minimal latency according to various embodiments. As illustrated, the example environment 100 may include the content source 12, the WebRTC server system 14, the client computing device 40, and a DRM license server 50, among other things. Note that for ease of illustration and understanding, only a single content source 12, a single client computing device 40, and a single DRM license server 50 are included in the example environment 100 of FIG. 1. However, those of ordinary skill in the relevant art will recognize that in reality multiple content sources 12, multiple client computing devices 40, and multiple DRM license servers 50 may be present in such environments in various alternative embodiments.

In brief, and in accordance with various embodiments, the content source 12 may stream to the WebRTC server system 14 media content data, which may or may not be DRM-protected. In various embodiments, the media content data that may be streamed from the content source 12 may contain one or more blocks of encrypted or unencrypted media content data, each block of encrypted or unencrypted media content data may contain a large amount of encrypted or unencrypted media content data. For example, if the block of encrypted or unencrypted media content data is an encrypted or unencrypted video content segment, the encrypted or unencrypted video content segment may contain as much as one or more megabytes of video content. On the other hand, if the block of encrypted or unencrypted media content data is an encrypted unencrypted image, audio, or text file, then the encrypted or unencrypted image, audio, or text file may contain as much as hundreds of kilobytes to one or more megabytes of encrypted image, audio, or text data.

If the media content data received by the WebRTC server system 12 is unencrypted (e.g., not DRM-protected), then the WebRTC server system 12 may "DRM-protect" the received media content data by encryption, and then may convert or chop the DRM-protected media content data into transport blocks containing relatively small blocks of encrypted media content data that are then streamed to the client computing device 40 through one or more WebRTC data channels 30. On the other hand, if the media content data that is received by the WebRTC server system 14 is already DRM-protected, then the WebRTC server system 14 may convert or chop the received DRM-protected media content data (with or without additional encryption) into transport blocks containing relatively small blocks of encrypted media content data that are then streamed to the client computing device 40 through one or more WebRTC data channels 30. That is, the transport blocks that are streamed to the client computing device 40 by the WebRTC server system 14 may include DRM-protected media content data that meets the maximum allowable data packet size that is acceptable to the WebRTC data channels 30. Currently, the maximum allowable data packet size for a WebRTC data channel 30 is 16 Kilobytes. Thus, by converting or chopping DRM-protected media content data (which may comprise fairly large encrypted media content segments or files) provided by a content source 12 into transport blocks that meet the maximum data packet limits of a WebRTC data channel 30, the relatively small amounts of encrypted media content data contained in the transport blocks may be streamed through one or more WebRTC data channels 30 avoiding the latency issues commonly faced using TCP-based protocols (e/.g., HLS, MPEG-DASH, MSS, etc.).

In various embodiments, the WebRTC server system 14 may be implemented by a single network device (e.g., a server or a workstation). Alternatively, the WebRTC server system 14 may be a cloud-based system employing a plurality of network computing devices such as one or more WebRTC-enabled media servers.

As briefly described above, in various embodiments, the content source 12 may stream to the WebRTC server system 14 media content data that may comprise one or more large blocks of encrypted or unencrypted media content data (e.g., video segments, audio, image, or text files). In various embodiments, the content source 12 may stream, for example, encrypted (or unencrypted) video or audio content data of live events (e.g., a sporting event, a video conference, an online auction, etc.) or may stream encrypted (or unencrypted) VOD. In some embodiments, the content source 12, which may be embodied in one or more computing devices (e.g., one or more servers, workstations, laptop or desktop computers, mobile devices, etc.), may include a media content source (e.g., a camera, an audio capturing device, a video or audio library, etc.), an encoder, a packager, and so forth. In various embodiments, when the media content to be streamed is video content, the packager may chop a media content stream into media content segments (hereinafter "segments") and may encrypt each segment for secured streaming to their destination. If the media content to be streamed, on the other hand, is comprised of one or more image, audio, or text files, the packager may encrypt each file for secured streaming.

In some embodiments, an HTTP GET procedure may be performed to request that DRM-protected (or non-DRM-protected) media content data from the content source 12 be transmitted to the WebRTC server system 14. In some alternative embodiments, the encrypted (or unencrypted) media content data may be written directly to the transport server file system.

In various embodiments, the WebRTC server system 14 may be one or more servers that facilitate the transmission of data, such as media content, through a WebRTC channel. As illustrated in FIG. 1, the WebRTC server system 14 may include, among other things, a transport server module 16, which may further include a manifest parser 20, a file transport 22 (which may further include an encryptor 22a and a converter 22b), and a client connector 24. As one skilled in the art will recognize, these modules (i.e., the transport server module 16 that includes the manifest parser 20, the file transport 22 with the encryptor 22a and the converter 22b, and the client connector 24) may be implemented by programmable circuitry, such as one or more processors, executing machine-readable instructions (e.g., software), by hardware such as application specific integrated circuit (ASIC), or by a combination thereof.

In some embodiments, the WebRTC server system 14 may comprise a server that facilitates the transmission of data through one or more WebRTC data channels 30. In some cases, the WebRTC server system 14 may be a WebRTC data server that facilitates the transmission of the data through one or more WebRTC data channels 30.

In brief, the manifest parser 20 may be configured to parse the manifest associated with media content to be received by the WebRTC server system 14 if the media content data to be received by the WebRTC server system 14 is DRM-protected media content data (e.g., encrypted media content data). That is, when the media content data that is received by the WebRTC server system 14 is, in fact, already DRM-protected, then the received DRM-protected media content data may have been formatted according to HLS, MPEG-DASH, XML JSON (JavaScript Object Notation) or MSS (maximum segment size). After the manifest is parsed, the media content data to be streamed may be pulled from the content source 12 via, for example, HTTP GET.

In various embodiments, the file transport 22 may, among other things, take media content data (which may or may not be encrypted) received from, for example, a content source 12 and process or format the received media content data into an encrypted format (e.g., transport blocks) that can be transmitted through one or more WebRTC data channels 30. In various embodiments, the client connector 24 may communicate (e.g., negotiate) with a transport server connector 44 of the client computing device 40 to initiate/establish one or more WebRTC data channels 30 for streaming media content data, such as transport blocks, to a client computing device 40.

As noted above, the file transport 22 may include an encryptor 22a and a converter 22b. In brief, the encryptor 22a may be configured to encrypt, for example, media content data, while the converter 22b may be configured to chop encrypted mediate content data into transport blocks for transmission through one or more WebRTC data channels 30.

In various embodiments, if the media content data that is received by the WebRTC server system 14 is unencrypted (i.e., non-DRM protected) media content data, then the encryptor 22a of the file transport 22 may encrypt the received media content data to generate DRM-protected media content data. On the other hand, if the media content data to be received by the WebRTC server system 14 is already encrypted (e.g., DRM-protected), then the received media content data may or may not be encrypted by the encryptor 22a.

In various embodiments, the convertor 22b of the file transport 22 may then take the DRM-protected media content data (which may comprise at least an encrypted video segment, an encrypted audio file, an encrypted text file, or an encrypted image file) and convert or split the DRM-protected media content data into multiple transport blocks, each transport block containing relatively small amounts of encrypted media content data (e.g., 16 kilobytes or less of encrypted media content data in some cases) for transport through a WebRTC data channel 30. To facilitate the transmission of the transport blocks to the client computing device 40, in various embodiments, the client connector 24 may communicate (e.g., negotiate) with the transport server connector 44 of the client computing device 40 to initiate/establish one or more WebRTC data channels 30 for streaming the transport blocks to the client computing device 40.

In some embodiments, the WebRTC server system 14 may include a packager that may chop a media content stream into media content segments, such as video segments. For example, if the content source 12 streams to the WebRTC server system 14 a video content stream that has not been packaged into video segments, the WebRTC server system 14 via, for example, a packager (not depicted) of the file transport 22 may initially package the video content stream into video segments before the video segments are encrypted and converted into transport blocks.

As noted above, the client computing device 40 may include a client 42 that includes the transport server connector 44, which may further include a reassembler 44a, and a content decryption module (CDM) 46, among other modules. In various embodiments, the client 42 may be implemented when an application is executed by one or more processors. Examples of a client 42 may include, for example, a browser, a media player, a video conferencing platform, or other applications/platforms that provide live streaming services and/or media on demand (e.g., video on demand). In some embodiments, the transport server connector 44 may be embodied as a software development kit (SDK) that is integrated into a client application such as a browser, a media player, a video conferencing platform, and so forth.

In various embodiments, the transport server connector 44 may communicate (e.g., negotiate) with the client connector 24 of the WebRTC server system 14 to establish one or more WebRTC data channels 30. Once the one or more WebRTC data channels 30 are initiated, the transport server connector 44 may receive from the WebRTC server system 14, via the one or more WebRTC data channels 30, transport blocks containing portions of the DRM-protected media content data that was acquired by the WebRTC server 12 either by receiving the DRM-protected media content data from a content source 12, or by encrypting non-DRM protected (e.g., unencrypted) media content data received from the content source 12. The reassembler 44a of the transport server connector 44 may then reassemble the DRM-protected media content data from the received transport blocks and relay the reassembled DRM-protected media content data to the CDM 46, which may then request for and obtain from a DRM license server 50 a license (which may include decryption key[s]) to decrypt the reassembled DRM-protected (e.g., encrypted) media content data. Once the encrypted media content data that was contained in the transport blocks are reassembled and decrypted, the reassembled and decrypted media content data may then be provided to, via the transport server connector 44, a user interface 48 (e.g., one or more displays and one or more speakers) for playback.

Figure 2A:
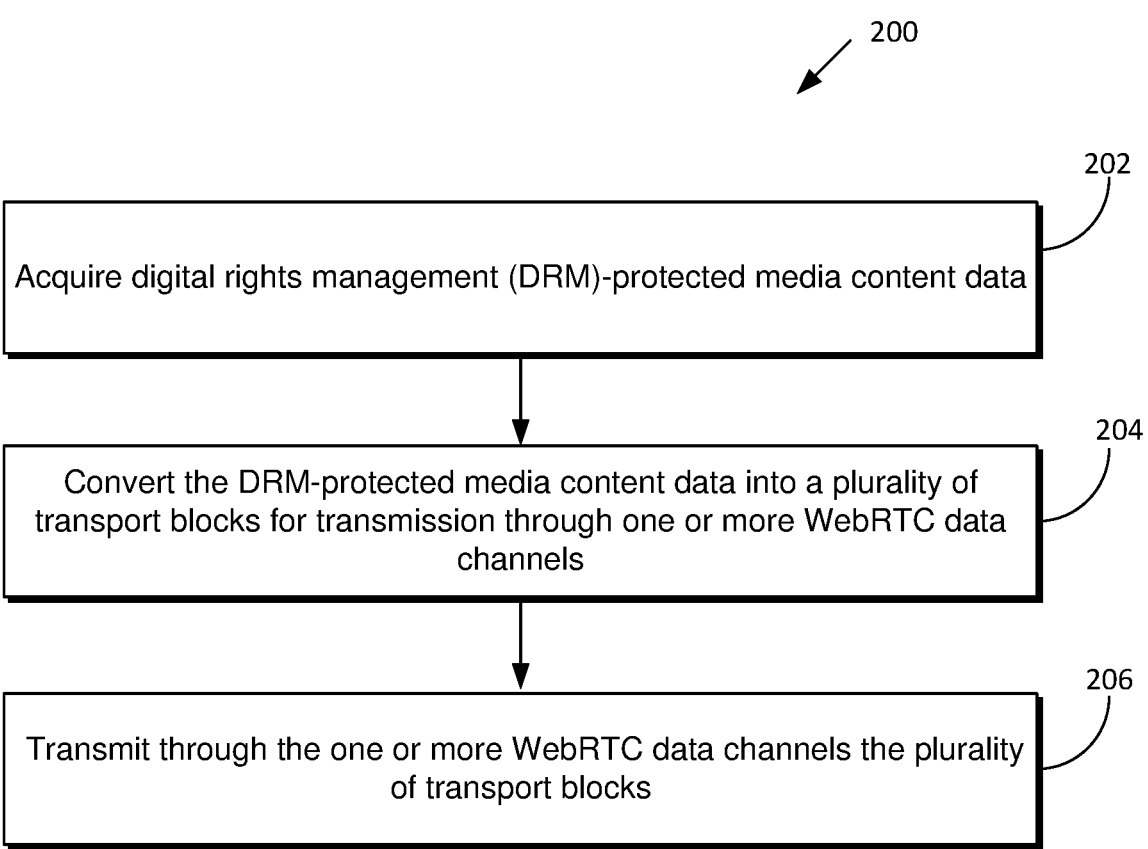
FIG. 2A is a high-level logic flowchart of a process, e.g., operation flow 200, according to some embodiments.

FIG. 2A illustrates an example operational flow 200 representing example operations for, among other things, streaming DRM-protected media content to a destination via one or more WebRTC data channels in accordance with some example embodiments. In some embodiments, the operations illustrated in FIG. 2A may be performed by the WebRTC server system 14 of FIG. 1. To facilitate understanding of operational flow 200, the following discussion of operational flow 200 will reference the example systems and features illustrated in FIG. 1. However, those skilled in the art will recognize that operational flow 200 may be implemented using systems and features other than those illustrated in FIG. 1.

For ease of understanding, the flowcharts are organized such that the initial flowcharts present implementations via an example implementation and thereafter the following flowcharts present alternate implementations and/or expansions of the initial flow chart(s) as either sub-component operations or additional component operations building on one or more earlier-presented flowcharts. Those having skill in the art will appreciate that the style of presentation utilized herein (e.g., beginning with a presentation of a flow chart(s) presenting an example implementation and thereafter providing additions to and/or further details in subsequent flowcharts) generally allows for a rapid and easy understanding of the various process implementations. In addition, those having ordinary skill in the art will further appreciate that the style of presentation used herein also lends itself well to modular and/or object-oriented program design paradigms.

In FIG. 2A, as well as the figures to follow thereafter (e.g., FIGS. 2B and 2C), various operations may be depicted in a box-within-a-box manner. Such depictions may indicate that an operation in an internal box may comprise an optional example implementation of the operational step illustrated in one or more external boxes. However, it should be understood that internal box operations may be viewed as independent operations separate from any associated external boxes and may be performed in any sequence with respect to all other illustrated operations, or may be performed concurrently. Also, although the various operational flows are presented in the sequence(s) illustrated in FIG. 2A, as well as in the other figures to follow thereafter, it should be understood that the various operations may be performed in a sequence or order other than those that are illustrated or may be performed concurrently.

Referring now to the example operational flow 200, which may begin when an acquisition operation 202 is performed for acquiring digital rights management (DRM)-protected media content data, the DRM-protected media content data being DRM-protected via encryption. For instance, and as an illustration, the transport server module 16 of the WebRTC server system 14 of FIG. 1 acquiring (e.g., receiving or generating) DRM-protected media content data (e.g., encrypted video segment such as one or more encrypted video frames or portion thereof, encrypted audio file, encrypted text file, and so forth), where the DRM-protected media content data to be acquired is DRM-protected via encryption.

As further illustrated in FIG. 2A, operational flow 200 may also include a conversion operation 204 for converting the DRM-protected media content data into a plurality of transport blocks for transmission through one or more WebRTC data channels. For instance, the converter 22b of the WebRTC server system 14 of FIG. 1 converting the DRM-protected media content data into a plurality of transport blocks (e.g., transport blocks that meet the maximum allowed data channel message size for a WebRTC data channel 30) for transmission through one or more WebRTC data channels 30.

In some embodiments, each of the plurality of transport blocks that the DRM-protected media content data is converted to by the converter 22b includes a different portion of the DRM-protected media content data rather than, for example, containing copies of the same DRM-protected media content data.

In some cases where the DRM-protected media content data includes a video segment, the plurality of transport blocks may include a transport block that includes a tag to indicate that the portion of the DRM-protected media content data contained in the tagged transport block corresponds to the last portion of the video segment. By doing so, the reassembly of that video segment, as well as other video segments, of the video content (e.g., a video conference, a VOD, etc.) being streamed may be facilitated at the client 42.

In addition to the acquisition operation 202 and the conversion operation 204, operational flow 200 may also include a transmission operation 206 for transmitting through the one or more WebRTC data channels the plurality of transport blocks. For instance, the file transport 22 of the WebRTC server system 14 transmitting through the one or more WebRTC data channels 30 the plurality of transport blocks.

As will be further described herein, various aspects of the acquisition 202, the conversion operation 204, and the transmission operation 206 may be implemented in various alternative ways. For example, in some embodiments, the DRM-protected media content data to be acquired via the acquisition operation 202 comprises a DRM-protected video content segment, a DRM-protected audio file, a DRM-protected text file, or a DRM-protected image file. For instance, the WebRTC server system 14 acquiring DRM-protected media content data that may comprise a DRM-protected (e.g., encrypted) video content segment (which may comprise a video frame or a portion thereof), a DRM-protected (e.g., encrypted) audio file, a DRM-protected (e.g., encrypted) text file, or a DRM-protected image file.

In some embodiments, the DRM-protected media content data to be acquired via the acquisition operation 202 includes an encrypted fragmented MP4 segment, an encrypted MPEG-TS segment, an encrypted image file, an encrypted text file, an encrypted binary block, or an encrypted Microsoft Smooth Streaming (MSS) segment. For instance, the DRM-protected media content data to be acquired by, for example, the WebRTC server system 14 may include an encrypted fragmented MP4 segment, an encrypted MPEG-TS segment, an encrypted image file, an encrypted text file, an encrypted binary block, or an encrypted Microsoft Smooth Streaming (MSS) segment.

In some embodiments, the DRM-protected media content data to be acquired via the acquisition operation 202 is encrypted with a DRM encryption scheme. For instance, the DRM-protected media content data to be acquired by the WebRTC server system 14 is encrypted with a DRM encryption scheme such as, for example, cipher block chaining mode (CBC), counter mode (CTR), or CBC in the CENC (CBCS).

As briefly described above and as will be further described below, the acquisition operation 202, as well as the conversion operation 204 and the transmission operation 206 of FIG. 2 may be executed in a variety of different ways in various alternative implementations. FIGS. 2B and 2C, for example, illustrate two alternative ways of executing the acquisition operation 202 of FIG. 2 according to various alternative implementations. For example, and as illustrated in FIG. 2B, the acquisition operation 202, in some embodiments, may include operation 211 for receiving media content data from a content source and operation 212 for encrypting the media content data to generate the DRM-protected media content data. For instance, the WebRTC server system 14 receiving media content data from a content source 12, and the encryptor 22a of the WebRTC server system 14 encrypting the media content data to generate the DRM-protected media content data (e.g., a DRM-protected video frame that includes a DRM-protected video component and a DRM-protected corresponding audio component, or portions thereof).

Figure 2C:
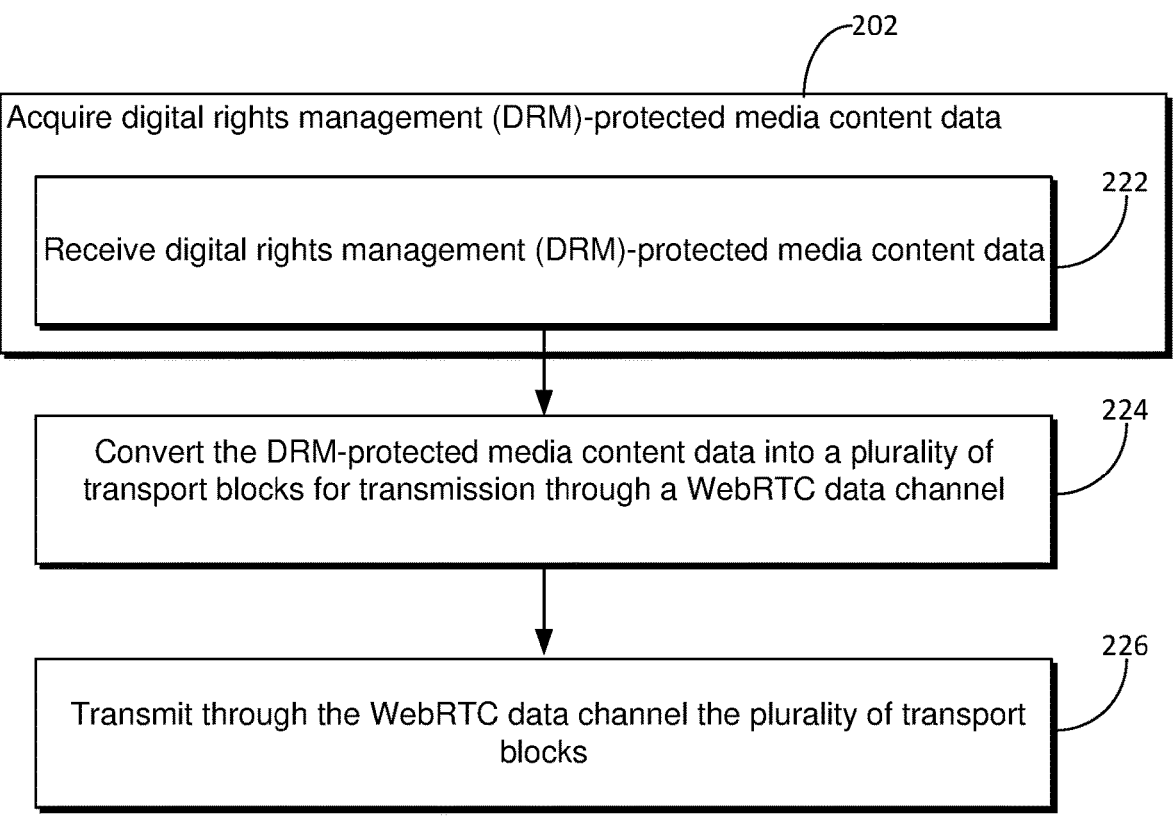
FIG. 2C is a high-level logic flowchart of a process depicting an alternate implementation of the acquisition operation 202 of FIG. 2A.

Referring to FIG. 2C, which illustrates an alternative way of implementing the acquisition operation 202 of FIG. 1 according to some embodiments. For these embodiments, the acquisition operation 202, as illustrated in FIG. 2c, may include an operation 222 for acquiring the DRM-protected media content data by receiving the DRM-protected media content data from a content source. For instance, the WebRTC server system 14 acquiring a DRM-protected media content data by receiving the DRM-protected media content data (e.g., one or more encrypted video segments, or one or more encrypted audio, image, or text files, where each segment or file may be fairly large from several hundred kilobytes in some cases to one or more megabytes in other cases) from a content source 12. In some embodiments, the DRM-protected media content data that is received may comprise a DRM-protected video content segment, a DRM-protected audio file, a DRM-protected text file, or a DRM-protected image file. In some cases, the DRM-protected media content data may comprise an encrypted fragmented MP4 segment, an encrypted MPEG-TS segment, an encrypted image file, an encrypted text file, an encrypted binary block, or an encrypted Microsoft Smooth Streaming (MSS) segment.

Referring back the operational flow 200 of FIG. 2A, in various embodiments where the DRM-protected media content data to be acquired is a DRM-protected video content data comprising a DRM-protected video component and a corresponding DRM-protected audio component of a DRM-protected video frame, and wherein converting the DRM-protected media content data into a plurality of transport blocks for transmission through one or more WebRTC data
channels includes converting the DRM-protected video
component into a first one or more transport blocks for
transmission through a first WebRTC data channel and
converting the DRM-protected audio component into a
second one or more transport blocks for transmission
through a second WebRTC data channel. For instance, the
DRM-protected media content data to be acquired by the
WebRTC 14 is a DRM-protected video content data com-
prising a DRM-protected video component and a corre-
sponding DRM-protected audio component of a DRM-
protected video frame, and wherein converting by the
converter 22b the DRM-protected media content data into a
plurality of transport blocks for transmission through one or
more WebRTC data channels includes converting by the
converter 22b the DRM-protected video component into a
first one or more transport blocks for transmission through
a first WebRTC data channel and converting by the converter
22b the DRM-protected audio component into a second one
or more transport blocks for transmission through a second
WebRTC data channel.

In some embodiments, the conversion operation 204 of
FIGS. 2A, 2B, and 2C for converting the DRM-protected
media content data into a plurality of transport blocks may
include converting the DRM-protected media content data
into a plurality of transport blocks that each includes up to
the maximum allowed data channel message size or less of
encrypted media content data. For example, the converter
22b of the WebRTC server system 14 of FIG. 1 converting
the DRM-protected media content data into a plurality of
transport blocks by converting or chopping the DRM-
protected media content data into a plurality of transport
blocks that each includes up to the maximum allowed data
channel message size or less of encrypted media content
data. In some cases, and under current standards, the maxi-
mum allowed data channel message size is 16 kilobytes.

In some cases, the one or more WebRTC data channels
through which the plurality of transport blocks are trans-
mitted through were established as a result of the WebRTC
server communicating with a client computing device to
establish the WebRTC data channel. For instance, the one or
more WebRTC data channels 30 through which the plurality
of transport blocks are transmitted through by the WebRTC
server system 30 were established as a result of the WebRTC
server system 30 communicating with a client computing
device 40 to establish the one or more WebRTC data
channels 30.

In some cases, the DRM-protected media content data to
be acquired is a DRM-protected video content data com-
prising a DRM-protected video component and a DRM-
protected corresponding audio component of a DRM-pro-
tected video frame, and wherein transmitting through the
one or more WebRTC data channels the plurality of transport
blocks includes transmitting one or more transport blocks of
the DRM-protected video component via a first WebRTC
data channel and transmitting one or more transport blocks
of the DRM-protected corresponding audio component via a
second WebRTC data channel. For instance, the DRM-
protected media content data to be acquired by, for example,
the WebRTC server system 14 is a DRM-protected video
content data comprising a DRM-protected (e.g., encrypted)
video component and a DRM-protected (e.g., encrypted)
corresponding audio component of a DRM-protected video
frame, and wherein transmitting through the one or more
WebRTC data channels 30 by the WebRTC server system 14
the plurality of transport blocks includes transmitting, by the
WebRTC server system 14, one or more transport blocks of the DRM-protected video component via a first WebRTC
data channel 30 and transmitting one or more transport
blocks of the DRM-protected corresponding audio compo-
nent via a second WebRTC data channel 30.

In some embodiments, the plurality of transport blocks
that are transmitted by, for example, the WebRTC server
system 14 may be transmitted through one or more WebRTC
data channels 30 to a client 42 (e.g., a browser, a media
player, a video conferencing platform, etc.) of a client
computing device 40.

Figure 3:
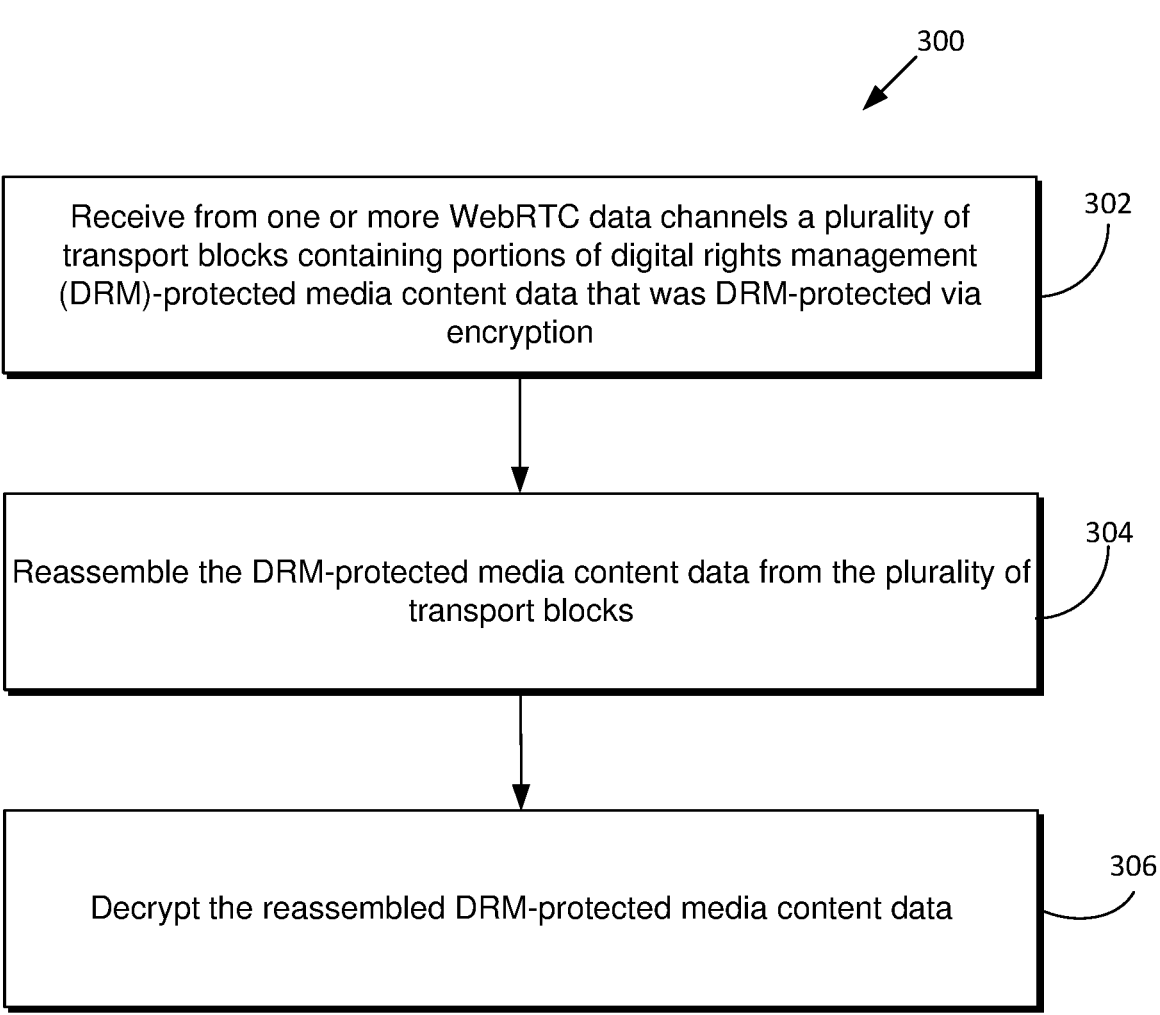
FIG. 3 is a high-level logic flowchart of a process, e.g., operation flow 300, according to some embodiments.

Referring to FIG. 3, which illustrates an example opera-
tional flow 300 representing example operations for, among
other things, receiving transport blocks containing DRM-
protected media content data via one or more WebRTC data
channels, and reassembling and decrypting the DRM-pro-
tected media content data according to various embodi-
ments. In some embodiments, the operations illustrated in
FIG. 3 may be performed by a computing device, such as the
client computing device 40 of FIG. 1. For ease of illustration
and to facilitate understanding of operational flow 300, the
following discussion of operational flow 300 will reference
the systems and features illustrated in FIG. 1. However,
those having ordinary skill in the art will recognize that
operational flow 300 may be implemented using systems
and features other than those illustrated in FIG. 1.

The example operational flow 300 may begin when a
receiving operation 302 is performed for receiving from one
or more WebRTC data channels a plurality of transport
blocks containing portions of digital rights management
(DRM)-protected media content data that has been DRM-
protected via encryption. For instance, and as an illustration,
the client computing device 40 of FIG. 1 receiving from one
or more WebRTC data channels 30 a plurality of transport
blocks containing portions of DRM-protected media content
data (e.g., encrypted media segment[s]) that has been DRM-
protected via encryption. In some cases, each transport block
of the plurality of transport blocks contains a different
portion of the DRM-protected media content data.

As further illustrated in FIG. 3, operational flow 300 may
also include a reassembling operation 304 for reassembling
the DRM-protected media content data from the plurality of
transport blocks. For instance, the client computing device
40 reassembling the DRM-protected media content data
(e.g., encrypted video or a portion thereof) from the plurality
of transport blocks. Note that since the transport blocks may
be transmitted sequentially, the reassembly of the DRM-
protected media content data may simply entail assembling
the portions of the DRM-protected media content data
contained in the transport blocks in the correct order.

In addition to the receiving operation 302 and the reas-
sembling operation 304, operational flow 300 may further
include a decrypting operation 306 for decrypting the reas-
sembled DRM-protected media content data. For instance,
the client computing device 40 decrypting the reassembled
DRM-protected media content data (e.g., DRM-protected
media content data that was encrypted by a content source
12 or by a WebRTC server system 14).

In various embodiments, the portions of the DRM-pro-
tected media content data that have been DRM-protected
and that are contained by the received transport blocks
comprise portions of an encrypted video content segment, an
encrypted audio file, an encrypted text file, or an encrypted
image file. For instance, in the receiving operation 302 of
operational flow 300, the client computing device 40 receiv-
ing from one or more WebRTC data channels 30 a plurality
of transport blocks containing portions of DRM-protected
media content data that has been DRM-protected via encryption (e.g., encrypted by a content source 12 or by a WebRTC server system 14) where the portions of the DRM-protected media content data that has been DRM-protected and contained in the received transport block comprise portions of an encrypted video content segment, an encrypted audio file, an encrypted text file, or an encrypted image file. In some embodiments, the plurality of transport blocks that are received are a plurality of transport blocks that contain portions of an encrypted fragmented MP4 data, an encrypted MPEG-TS data, an encrypted image data, an encrypted text data, an encrypted binary block data, or an encrypted Microsoft Smooth Streaming (MSS) data.

In some cases, each transport block to be received includes up to the maximum allowed data channel message size or less, per WebRTC data channel limits, of encrypted media content data. For instance, each transport block to be received by the client computing device 40 includes up to the maximum allowed (per WebRTC data channel standards) data channel message size or less of encrypted media content data. For example, in same cases, each transport block to be received may be 16 kilobytes (e.g., the current WebRTC data channel limit) or less. Although the current maximum allowed data channel message size is 16 kilobytes, it is contemplated that the maximum limit may change in the future.

In some embodiments, receiving the plurality of transport blocks containing portions of DRM-protected media content data that has been DRM-protected via encryption may comprise receiving from a first WebRTC data channel one or more transport blocks containing at least a portion of a DRM-protected video component of a DRM-protected video frame and receiving from a second WebRTC data channel one or more transport blocks containing at least a portion of a DRM-protected corresponding audio component of the DRM-protected video frame. For instance, the client computing device 40 receiving the plurality of transport blocks containing portions of DRM-protected media content data (e.g., video segment or a portion thereof) that has been DRM-protected via encryption (e.g., encrypted by a content source 12 or by a WebRTC server system 14) may comprise receiving from a first WebRTC data channel 30 by the client computing device 40 one or more transport blocks containing at least a portion of a DRM-protected video component of a DRM-protected video frame and receiving from a second WebRTC data channel 30 by the client computing device 40 one or more transport blocks containing at least a portion of a DRM-protected corresponding audio component of the DRM-protected video frame.

In various embodiments, the plurality of transport blocks that are received by the client computing device 40 may be a plurality of transport blocks that contain portions of an encrypted fragmented MP4 data, an encrypted MPEG-TS data, an encrypted image data, an encrypted text data, an encrypted binary block data, or an encrypted Microsoft Smooth Streaming (MSS) data. In the same or alternative embodiments, receiving from the one or more WebRTC data channels the plurality of transport blocks may include, for example, the client computing device 40 communicating with a WebRTC server to initiate the WebRTC data channel prior to receiving the plurality of the transport blocks from the WebRTC data channel.

In some embodiments, the decrypting of the reassembled DRM-protected media content data includes decrypting the reassembled DRM-protected media content data that was encrypted with a DRM encryption scheme, the DRM encryption scheme being cipher block chaining mode (CBC), counter mode (CTR), or CBC in the CENC (CBCS).

For instance, the content decryption module 46 decrypting the reassembled DRM-protected media content data by decrypting the reassembled DRM-protected media content data that was encrypted (e.g., encrypted by a content source 12 or by a WebRTC server system 14) with a DRM encryption scheme, the DRM encryption scheme being cipher block chaining mode (CBC), counter mode (CTR), or CBC in the CENC (CBCS).

In some embodiments, decrypting of the reassembled DRM-protected media content data includes providing the decrypted and reassembled media content data to a computer program for playback. For instance, the content decryption module 46 decrypting the reassembled DRM-protected media content data including providing the decrypted and reassembled media content data to a computer program (e.g., a browser, a media player, or a video-conferencing application) for playback. In some cases, the computer program may be a native application or a web application.

According to some alternative embodiments of the present disclosure, WebRTC video channel methods and systems are disclosed herein for securely streaming DRM-protected media content via a WebRTC video channel and without the latency commonly encountered when using only a conventional TCP-based streaming protocol such as HLS, MPEG-DASH, and MSS to stream DRM-protected media content data (e.g., video content, audio content, image content, or text content). For these embodiments, the WebRTC video channel methods and systems may, in brief, acquire DRM-protected media content frame (e.g., an encrypted video frame that includes both an encrypted video component and a corresponding encrypted audio component of the encrypted video frame and that have been multiplexed for transmission through a single WebRTC media channel), package the DRM-protected media content frame to disguise the DRM-protected media content frame as a WebRTC-compliant video frame container package and transmit the WebRTC-compliant video frame container package through a WebRTC video channel. By packaging the DRM-protected media content frame as a WebRTC-compliant video frame container package, the DRM-protected media content frame may be transmitted through a WebRTC media channel such as a WebRTC video channel even though DRM-protected (e.g., encrypted) media content normally cannot be transmitted through the WebRTC media channel (e.g., WebRTC video channel).

As one of ordinary skill in the art will recognize, typically each video frame of a video stream will comprise a video component and a corresponding audio component that are normally played together, generally in sync, during playback. However, when such video content is streamed, the video components and the corresponding audio components of the video frames being streamed are streamed separately (e.g., a video component stream and an audio component stream via two distinct channels). That is, when conventional techniques are used to send unencrypted video frames through WebRTC media channels, the video components of video frames are typically sent through a WebRTC video channel, while the corresponding audio components of the video frames are sent through a WebRTC audio channel. As will be further described herein, in various embodiments, the encrypted video components of video frames may be multiplexed with the encrypted corresponding audio components of the video frames for transmission through a single WebRTC media channel such as a WebRTC video channel. Further, to transmit through a single WebRTC video channel the multiplexed encrypted video component and encrypted corresponding audio component of an encrypted video frame, the multiplexed encrypted video component and the encrypted corresponding audio component may each be packaged in a format that allows for the successful transmission of such encrypted media content through the single WebRTC video channel as will further described herein.

According to various embodiments, the WebRTC video channel methods for securely streaming DRM-protected media content may be implemented at least partly by a WebRTC server system, similar to the WebRTC data channel methods described above. For the embodiments, the WebRTC server system may initially acquire a DRM-protected media content frame (i.e., an encrypted video frame that includes both an encrypted video component and a corresponding encrypted audio component that have been multiplexed for transmission through a single WebRTC media channel). The acquisition of the DRM-protected media content frame may be achieved by employing two different means in various alternative embodiments. For example, in a first embodiment, the DRM-protected media content frame may be acquired when the WebRTC server system, for example, receives an unencrypted video component and an unencrypted corresponding audio component of a video frame, encrypts both the video component and the corresponding audio component, and then multiplexes the encrypted video component and the encrypted corresponding audio component to generate a DRM-protected media content frame. In a second embodiment, the DRM-protected media content frame may be acquired when the WebRTC server system, for example, receives an already encrypted video component and an already encrypted corresponding audio component of an encrypted video frame, and then multiplexes the encrypted video component and the encrypted corresponding audio component to generate the DRM-protected media content frame.

In various embodiments, and as briefly described above, in order to transmit the DRM-protected media content frame through a WebRTC video channel, the DRM-protected media content frame may be packaged to disguise the DRM-protected media content frame as a WebRTC-compliant video frame by including the DRM-protected media content frame as a payload for a WebRTC-compliant video frame container that includes a WebRTC-compliant coder and decoder (codec) header to produce a WebRTC-compliant video frame container package. In some embodiments, an unencrypted pixel may be included in the payload of the WebRTC-compliant video frame container package to facilitate transmission of the WebRTC-compliant video frame container package through a WebRTC video channel. The WebRTC-compliant video frame container package may then be successfully transmitted through a WebRTC video channel.

Figure 4:
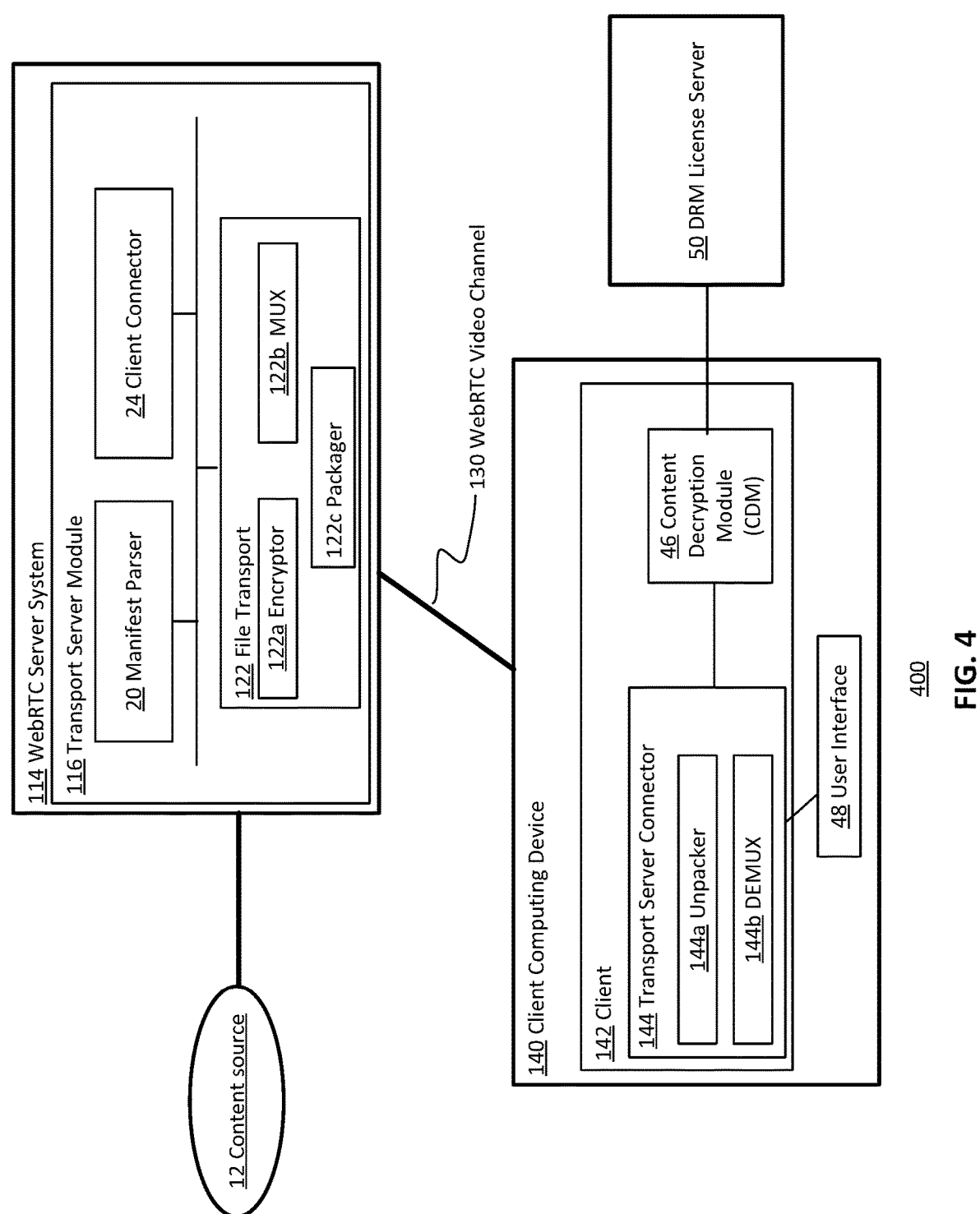
FIG. 4 is a high-level block diagram of an example environment in which DRM-protected media content is transmitted from a content source to a content destination via a WebRTC media channel, such as a WebRTC video channel, in accordance with some example embodiments.

FIG. 4 is a high-level block diagram of an example environment 400 in which a Web-RTC server system 114 may be configured to, for example, acquire a DRM-protected media content frame, package the DRM-protected media content frame as a payload for a WebRTC-compliant video frame container to generate a WebRTC-compliant video frame container package, and transmit the WebRTC-compliant video frame container package via a WebRTC video channel. As illustrated, the example environment 400 includes a content source 12, a WebRTC server system 114, a client computing device 140, and a DRM license server 50, similar to the example environment 400 of FIG. Note that the content source 12 and the DRM license server 50 illustrated in FIG. 4 mirrors the content source 12 and the DRM license server 50 illustrated in FIG. 1, performing the same or similar functions.

In various embodiments, the WebRTC server system 114 may be implemented by a single network device (e.g., a server or a workstation). Alternatively, the WebRTC server system 14 may be a cloud-based system employing a plurality of network computing devices such as one or more WebRTC-enabled media servers.

As further illustrated in FG. 4, the WebRTC Server system 114 of FIG. 4 includes a transport server module 116, similar to the WebRTC server system 14 of FIG. And although the transport server module 116 of FIG. 4 may include a manifest parser 20 and a client connector 24, the same as the transport server module 16 of FIG. 1, the transport server module 116 of FIG. 4 includes a file transport 122 that is different from the file transport 22 of the transport server module 16 of FIG. 1, that may include modules for performing different functions as those performed by the file transport 22 of FIG. 1. Also, and as illustrated in FIG. 4, the file transport 122 of FIG. 4 although includes an encryptor 122a, similar to the encryptor 22a of the file transport 22 of FIG. 1, the file transport 122 also includes a multiplexer (MUX) 122b and a packager 122c that may not be included with the file transport 22 of FIG. 1, which instead has a converter 22b as discussed above.

Note that although not illustrated in FIG. 4, the file transport 122 of FIG. 4 may also include a converter 22b, similar to the converter 22b in FIG. 1, to perform the functions of the WebRTC server system 14 of FIG. 1 for transmitting DRM-protected media content data as transport blocks through one or more WebRTC data channels. That is, and as one of ordinary skill in the art will recognize, the functionalities of the transport server module 116 (e.g., WebRTC server system 116) of FIG. 4 and the functionalities of the transport server module 16 (e.g., WebRTC server system 14) of FIG. 1 may be combined into a single transport server module of a WebRTC server system to provide the functionalities of the WebRTC server system 14 of FIG. 1 and the functionalities of the WebRTC server system 114 of FIG. 4.

In various embodiments, the content source 12 may transmit encrypted or unencrypted media content data, such as encrypted or unencrypted video and corresponding audio components of video frames to the WebRTC server System 114. In various embodiments, the transmission of the encrypted or unencrypted media content data to the WebRTC server system 114 may be via WebRTC-HTTP ingestion protocol (WHIP).

The functionalities of the manifest parser 20 and the client connector 24 were discussed with respect to FIG. 1 and therefore, will not be discussed here. As for the encryptor 122a, the multiplexer 122b, and the packager 122c, the functionalities of these modules may be best understood with reference to the flow process 500 of FIG. 5.

Referring particularly now to the flow process 500 of FIG. 5, which is an example high-level process for, among other things, encrypting and packaging media content data, such as an unencrypted video frame, to generate WebRTC-compliant video frame container package for transmission through a WebRTC video channel 130 according to some embodiments. In some embodiments, the video frame may be an I-frame. As will be further described herein, the WebRTC-compliant video frame container package may include a DRM-protected video frame. In various embodiments, flow process 500 may be implemented by the example WebRTC server system 114 of FIG. 4. To facilitate understanding of the other flow processes to be described herein, such as those illustrated in FIGS. 7A, 7B, and 7C, flow process 500 identifies and provides the names of the inputs/outputs of various operations as performed by the WebRTC server system 114 (and its modules) of FIG. 4 for transmitting DRM-protected media content data through a WebRTC video channel.

Process 500 may begin at 504 when, for example, the WebRTC server system 114 of FIG. 4 receives a video frame 506 including a video component and a corresponding audio component. In various embodiments, the videoframe 506 may be received from a content source 12 via WHIP. In some embodiments, the received video component and the corresponding audio component of the video frame 506 may be received via two separate media streams, a video component stream and a corresponding audio component stream. The received video component and the corresponding audio component of the videoframe 506 may then be encrypted at 508 by the encryptor 122a to output an encrypted video component and an encrypted corresponding audio component 510 of a DRM-protected video frame. At 512, the encrypted video component and the encrypted corresponding audio component 510 are multiplexed by the multiplexer 122b to generate a DRM-protected media content frame 514 that includes the encrypted video component and the encrypted corresponding audio component 512.

At 516, the DRM-protected media content frame 514 may be packaged by the packager 122c to generate a WebRTC-compliant video frame container package 518 that includes a WebRTC-compliant codec header and the DRM-protected media content frame 514. More particularly, the packaging that may be performed at 516 on the DRM-protected media content frame 514 may entail including the DRM-protected media content frame 514 as a payload for a WebRTC-compliant video frame container that includes at least a WebRTC-compliant codec header to produce the WebRTC-compliant video frame container package 518. In various embodiments, the WebRTC-compliant videoframe container package 518 to be produced by the packaging operation 516 may also include a WebRTC-compliant codec ender, and an unencrypted pixel (e.g., unencrypted gray-scale pixel) that may be included in the payload of the WebRTC-compliant video frame container. In various embodiments, the WebRTC-compliant codec header may be a VP8 codec header, a VP9 codec header, or an H264 codec header. In some embodiments, the WebRTC compliant codec header may be a 10-byte VP8 codec header.

Finally, the file transport 122 of the WebRTC server system 114 may transmit the WebRTC-compliant video frame container package 518 via a WebRTC video channel 130. In various embodiments, the WebRTC-compliant video frame container package 518 may be transmitted to, for example, a client computing device 140 (e.g., laptop or desktop computer, a tablet computer, a smartphone, and so forth) via WebRTC-HTTP ingestion protocol (WHIP).

Note that the receiving operation 504, the encryption operation 508, and the multiplexing operation 512 may represent one implementation of an acquisition operation 702 of FIG. 7B to be described below. In various embodiments where the WebRTC server system 114 receives an already encrypted video frame, the encryption operation 508 in process 500 may be omitted as part of the acquisition operation 702 of FIG. 7C.

Referring back to FIG. 4, the client computing device 140 includes a client 142 that includes a transport server connector 144 and content decryption module (CDM) 46, similar to the client computing device 40 of FIG. 1, and a user interface 48 (e.g., one or more displays and one or more speakers) for playback of media content data such as video frames. The CDM 46 of FIG. 4, like the CDM 46 of FIG. 1 may request for and obtain from the DRM license server 50 a license (which may include decryption key[s]) to decrypt DRM-protected media content data such as encrypted video frames.

As to the transport server connector 144 of FIG. 4, and unlike the transport server connector 44 of FIG. 1, the transport server connector 144 includes an unpacker 144a and a demultiplexer (DEMUX) 144b to perform unpacking and demultiplexing operations respectively of the packaged DRM-protected media content data such as the WebRTC-compliant video frame container package 518 received from the WebRTC server system 114 via the WebRTC video channel 130.

Figure 6:
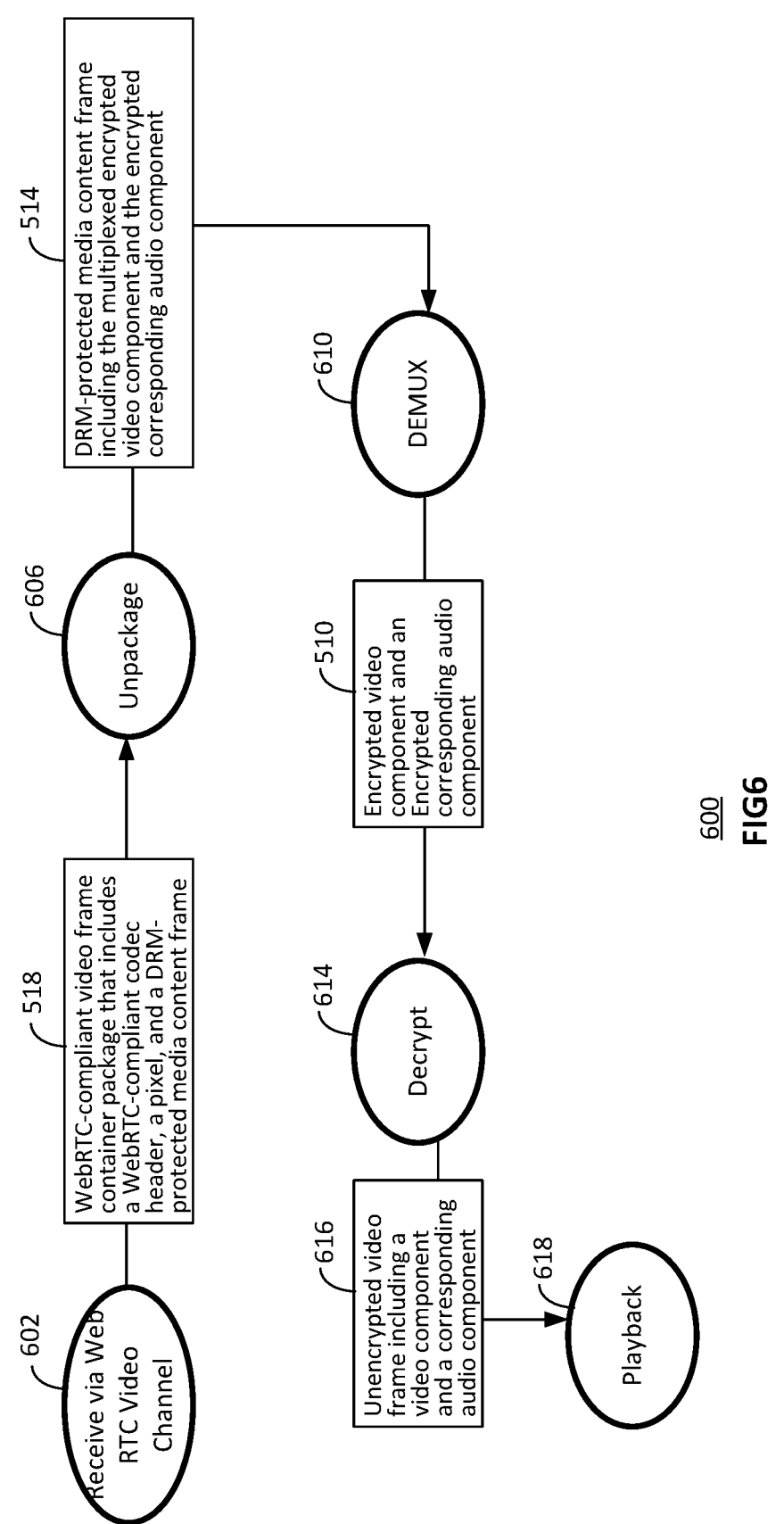
FIG. 6 illustrates the inputs/outputs of various operations of an example flow process in accordance with some example embodiments.

Referring now to FIG. 6, which is a flow process 600 that shows how the client computing device 140 takes packaged DRM-protected media content data, such as the WebRTC-compliant video frame container package 518, transmitted by the WebRTC server system 114 via the WebRTC video channel 130, and unpackages, demultiplexes, and decrypts the WebRTC-compliant video frame container package 518 for playback. More particularly, flow process 600 identifies and provides the names of the inputs/outputs of various operations, as performed by the client computing device 40 (and its modules), for unpackaging, demultiplexing, and decrypting of the WebRTC-compliant video frame container package 518 received from the WebRTC video channel 130.

Process 600 may begin at 602 when a WebRTC-compliant video frame container package 518 that includes the WebRTC-compliant codec header and the DRM-protected media content frame 514 is received by the client computing device 140. At 606, the WebRTC-compliant video frame container package 518 is unpackaged by, for example, the unpacker 144a to output a DRM-protected media content frame 514 that includes the multiplexed encrypted video component and the encrypted corresponding audio component. In various embodiments, the unpacking operation 606 may entail filtering or removing from the WebRTC-compliant video frame container package 518 a WebRTC-compliant codec header, a WebRTC-compliant codec ender, and an unencrypted pixel. At 610, the DRM-protected media content frame 514 is demultiplexed by, for example, the DEMUX 144b to output an encrypted video component and an encrypted corresponding audio component 510 of a DRM-protected video frame. At 614, the encrypted video component and the encrypted corresponding audio component 510 of a DRM-protected video frame is then decrypted b, for example, the content decryption module 46 to output an unencrypted videoframe 616 including a video component and a corresponding audio component for, for example, playback 618.

Figure 7A:
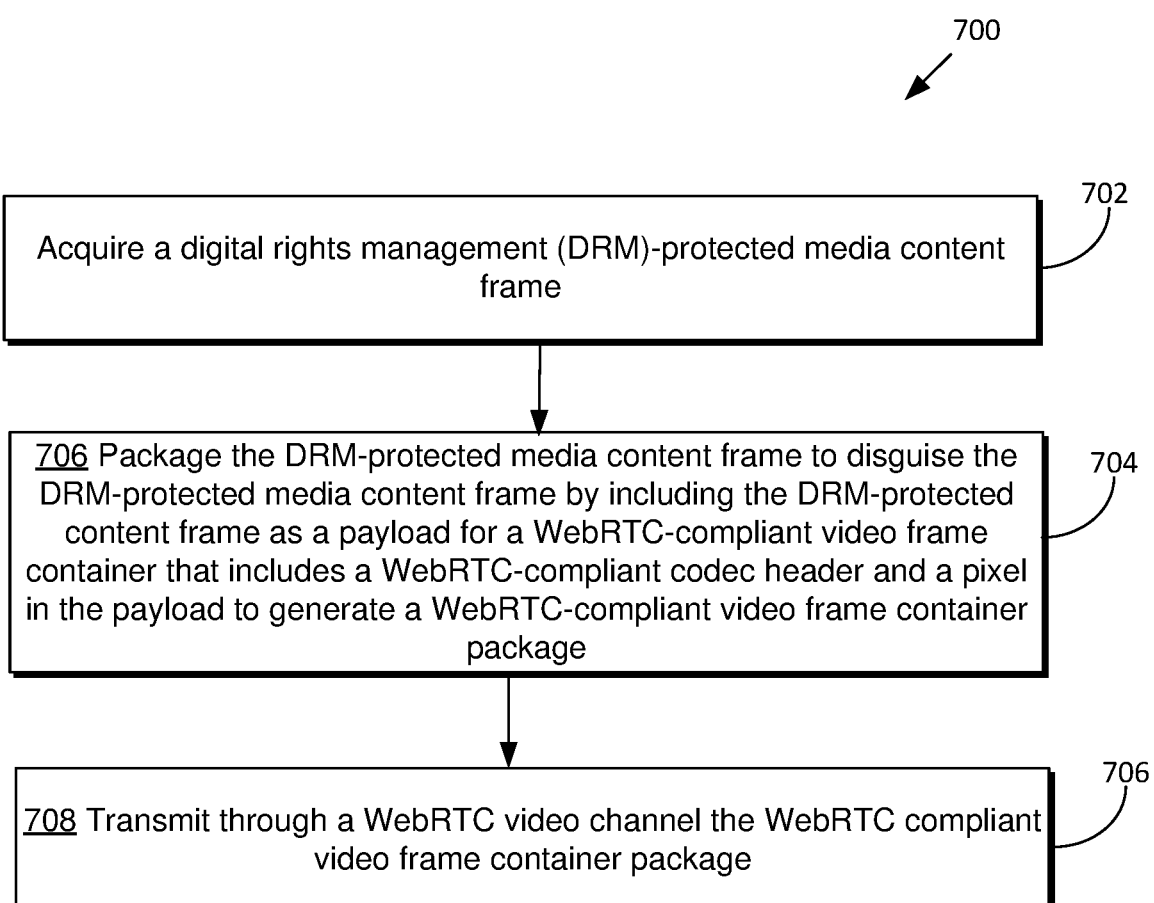
FIG. 7A is a high-level logic flowchart of a process, e.g., operation flow 700, according to some embodiments.

FIG. 7A illustrates an example operational flow 700 representing example operations for, among other things, streaming DRM-protected media content, such as encrypted video frames of a DRM-protected video stream via a WebRTC media channel, such as a WebRTC video channel, in accordance with some example embodiments. In some embodiments, the operations illustrated in FIG. 7A may be performed by the WebRTC server system 114 of FIG. 4. For ease of illustration and to facilitate understanding of operational flow 700, the following discussion of operational flow 700 will reference the example systems, features, and processes illustrated in FIGS. 4, 5, and 6. However, those skilled in the art will recognize that operational flow 700 may be implemented using systems, features, and processes other than those illustrated in FIGS. 4, 5, and 6.

As before, for ease of understanding, the flowcharts are organized such that the initial flowcharts present implementations via an example implementation and thereafter the following flowcharts present alternate implementations and/ or expansions of the initial flow chart(s) as either sub-component operations or additional component operations building on one or more earlier-presented flowcharts. Those having skill in the art will appreciate that the style of presentation utilized herein (e.g., beginning with a presentation of a flow chart(s) presenting an example implementation and thereafter providing additions to and/or further details in subsequent flowcharts) generally allows for a rapid and easy understanding of the various process implementations. In addition, those having ordinary skill in the art will further appreciate that the style of presentation used herein also lends itself well to modular and/or object-oriented program design paradigms.

In FIG. 7A, as well as the figures to follow thereafter (e.g., FIGS. 7B and 7C), various operations may be depicted in a box-within-a-box manner. Such depictions may indicate that an operation in an internal box may comprise an optional example implementation of the operational step illustrated in one or more external boxes. However, it should be understood that internal box operations may be viewed as independent operations separate from any associated external boxes and may be performed in any sequence with respect to all other illustrated operations or may be performed concurrently. Also, although the various operational flows are presented in the sequence(s) illustrated in FIG. 7A, as well as in the other figures to follow thereafter, it should be understood that the various operations may be performed in a sequence or order other than those that are illustrated or may be performed concurrently.

In various embodiments, the example operational flow 700 may begin when an acquisition operation 702 is performed for acquiring a digital rights management (DRM)-protected media content frame. For instance, and as an illustration, the WebRTC server system 114 of FIG. 4 acquiring (e.g., receiving or generating) a DRM-protected media content frame 514 (which may comprise of multiplexed encrypted video component and encrypted corresponding audio component of a DRM-protected video frame for transmission, for example, through a single WebRTC media channel).

As further illustrated in FIG. 7A, operational flow 700 may also include a packaging operation 704 for packaging the DRM-protected media content frame to disguise the DRM-protected media content frame as a WebRTC-compliant video frame by including the DRM-protected media content frame as a payload for a WebRTC-compliant video frame container that includes a WebRTC-compliant coder and decoder (codec) header to produce a WebRTC-compliant video frame container package. For instance, the packager 122c of the WebRTC server system 114 packaging the DRM-protected media content frame to disguise the DRM-protected media content frame as a WebRTC-compliant video frame by including the DRM-protected media content frame 514 as a payload for a WebRTC-compliant video frame container that includes a WebRTC-compliant codec header to produce a WebRTC-compliant video frame container package 518.

In addition to the acquisition operation 702 and the packaging operation 794, operational flow 700 may also include a transmission operation 706 for transmitting through a WebRTC video channel the WebRTC-compliant video frame container package. For instance, the file transport 122 of the WebRTC server system 114 transmitting through a WebRTC video channel 130 the WebRTC-compliant video frame container package 518 (e.g., a WebRTC-compliant video frame container that includes a WebRTC-compliant codec header, such as a 10-byte VP8 header, a WebRTC-compliant codec ender, such as a VP8 ender, and a payload that includes an unencrypted pixel and a DRM-protected media content frame 514).

As will be further described herein, various aspects of the acquisition operation 702, the packaging operation 704, and the transmission operation 706 may be implemented in various alternative ways. For example, in some embodiments, the DRM-protected media content frame to be acquired and included as the payload for the WebRTC-compliant video frame container may include an encrypted video component and an encrypted corresponding audio component of a DRM-protected video frame. For instance, and as an illustration, the DRM-protected media content frame to be acquired by the WebRTC server system 114 and to be included as the payload for the WebRTC-compliant video frame container includes an encrypted video component and an encrypted corresponding audio component 510 of a DRM-protected video frame As briefly described above and as will be further described below, the acquisition operation 702, as well as the packaging operation 704, and the transmission operation 706 of FIG. 7A may be executed in a variety of ways in various alternative implementations. FIGS. 7B and 7C, for example, illustrate two alternative ways of executing the acquisition operation 702 of FIG. 7 according to various alternative implementations. For example, and as illustrated in FIG. 7B, the acquisition operation 702 of FIG. 7A in some implementations may include an operation 711 for receiving a video component and a corresponding audio component of a video frame, an operation 712 for encrypting the video component and the corresponding audio component, and an operation 714 for multiplexing the encrypted video component and the encrypted corresponding audio component to generate the DRM-protected media content frame. For instance, the WebRTC server system 114 of FIG. 4 receiving a video component and a corresponding audio component of a video frame 506 from, for example, a content source 12. The encryptor 122a of the WebRTC server system 114 may then encrypt the received video component and the corresponding audio component, and the MUX 122b of the WebRTC server system 114 may then multiplex the encrypted video component and the encrypted corresponding audio component to generate the DRM-protected media content frame 514.

In some embodiments, the video component and the corresponding audio component of a video frame that are received in operation 711 are received via WebRTC-HTTP ingestion protocol (WHIP). For instance, the video component and the corresponding audio component of a video frame 506 that are received by the WebRTC server system 114 are received via WHIP.

Referring to FIG. 7C, which illustrates an alternative way of implementing the acquisition operation 702 of FIG. 7A according to some embodiments. For these embodiments, the acquisition operation 702 may include an operation 722 for receiving an encrypted video component and an encrypted corresponding audio component of an encrypted video frame, and an operation 724 for multiplexing the encrypted video component and the encrypted corresponding audio component to generate the DRM-protected media content frame. For instance, the WebRTC server system 114 receiving an encrypted video component and an encrypted corresponding audio component 510 of an encrypted video frame, and the MUX 122b of the WebRTC server system 114 multiplexing the encrypted video component and the encrypted corresponding audio component 510 to generate the DRM-protected media content frame 514.

In some embodiments, the encrypted video component and the encrypted corresponding audio component that are received in operation 722 are received via WebRTC-HTTP ingestion protocol (WHIP). For instance, the WebRTC server system 114 receiving the encrypted video component and the encrypted corresponding audio component 510 via WHIP.

In some embodiments, the DRM-protected media content frame to be acquired in the acquisition operation 702 may be encrypted with a DRM encryption scheme. For instance, the DRM-protected media content frame to be acquired by the WebRTC server system 114 is encrypted with a DRM encryption scheme such as cipher block chaining mode (CBC), counter mode (CTR), or CBC in the CENC (CBCS).

In some embodiments, the packaging of the DRM-protected media content frame in the packaging operation 704 comprises including an unencrypted pixel in the payload for the WebRTC-compliant video frame container. For instance, the packager 122c of the WebRTC server system 114 packaging the DRM-protected media content frame 514 by including a unencrypted pixel in the payload for the WebRTC-compliant video frame container among other things.

In some embodiments, the packaging of the DRM-protected media content frame to produce the WebRTC-compliant video frame container package during the packaging operation 704 may comprise including in the WebRTC-compliant video frame container package a WebRTC-compliant codec ender. For instance, packaging by the packager 122c the DRM-protected media content frame 514 to produce the WebRTC-compliant video frame container package 518 by the packager 122c including in the WebRTC-compliant video frame container package 518 a WebRTC-compliant codec ender.

In some embodiments, the WebRTC-compliant codec header of the WebRTC-compliant video frame container package 518 to be produced is a VP8 codec header. In other embodiments, however, the WebRTC-compliant codec header of the WebRTC-compliant video frame container package 518 to be produced is a VP9 or H264 codec header.

In some embodiments, the transmitting through a WebRTC video channel the WebRTC-compliant video frame container package includes transmitting the WebRTC-compliant video frame container package via WebRTC-HTTP egress protocol (WHEP). For instance, the WebRTC server system 114 transmitting through a WebRTC video channel 130 the WebRTC-compliant video frame container package 518 by transmitting the WebRTC-compliant video frame container package 518 through the WebRTC video channel 130 via WHEP.

Referring to FIG. 8, which illustrates an example operational flow 800 representing example operations for, among other things, receiving and unpackaging a WebRTC-compliant video frame container package and then demultiplexing and decrypting the media content, such as a video frame, that was contained in the WebRTC-compliant video frame container package according to various embodiments. In some embodiments, the operations illustrated in FIG. 8 may be performed by a computing device, such as the client computing device 140 of FIG. 5. For ease of illustration and to facilitate understanding of operational flow 800, the following discussion of operational flow 300 will reference the example systems, features, and processes illustrated in FIGS. 4, 5 and 6. However, those having ordinary skill in the art will recognize that operational flow 200 may be implemented using systems, features, and processes other than those illustrated in FIGS. 4, 5, and 6.

The example operational flow 800 may begin when a receiving operation 802 is performed for receiving from a Web Real-Time Communication (WebRTC) video channel a WebRTC-compliant video frame container package that includes a WebRTC-compliant coder and decoder (codec) header and a digital rights management (DRM)-protected media content frame comprising encrypted video component and encrypted corresponding audio component. For instance, and as an illustration, the client computing device 140 of FIG. 4 receiving from a WebRTC video channel 130 a WebRTC-compliant videoframe container package 518 that includes a WebRTC-compliant codec header and a DRM-protected media content frame comprising multiplexed encrypted video component and a encrypted corresponding audio component 510.

As further illustrated in FIG. 8, operational flow 800 may also include an unpackaging operation 804 for unpackaging the WebRTC-compliant video frame container package by discarding at least the WebRTC-compliant codec header to output a DRM-protected media content frame containing the multiplexed encrypted video component and encrypted corresponding audio component. For instance, the unpacker 144a of the client computing device 140 of FIG. 4 unpackaging the WebRTC-compliant video frame container package 518 by discarding (e.g., removing) at least the WebRTC-compliant codec header to output a DRM-protected media content frame 514 containing the multiplexed encrypted video component and encrypted corresponding audio component 510. In some cases, in addition to discarding the WebRTC-compliant codec header, a WebRTC-compliant codec ender and an unencrypted pixel (which may be included in the payload of the WebRTC-compliant videoframe container package 518) may also be discarded from the WebRTC-compliant video frame container package 518.

In addition, operational flow 800 may also include a demultiplexing operation 806 for demultiplexing the multiplexed encrypted video component and the encrypted corresponding audio component to output an encrypted video component and a corresponding audio component. For instance, the DEMUX 144b of the client computing device 140 demultiplexing the encrypted video component and the encrypted corresponding audio component 510 to output an encrypted video component and a corresponding audio component.

In addition, operational flow 800 may also include a decrypting operation 808 for decrypting the encrypted video component and the encrypted corresponding audio component. For instance, the content decryption module 40 of FIG. 5 decrypting the encrypted video component and the encrypted corresponding audio component 510. In various embodiments, the output of operation 808 may be used for playback.

In various embodiments, the WebRTC-compliant video frame container package that is received during the receiving operation 802 may be received via WebRTC-HTTP egress protocol (WHEP). For instance, the client computing device 140 of FIG. 1 receiving the WebRTC-compliant video frame container package 518 via WHEP.

In some embodiments, the receiving from the WebRTC video channel the WebRTC-compliant video frame container package comprises communicating with a WebRTC server system to initiate the WebRTC data channel prior to receiving the WebRTC-compliant video frame container package. For instance, the client computing device 140 receiving from the WebRTC video channel 130 the WebRTC-compliant video frame container package 518 by communicating with a WebRTC server system 114 to initiate (e.g., establish) the WebRTC data channel 130 prior to receiving the WebRTC-compliant video frame container package 518.

In some embodiments, the WebRTC-compliant codec header of the received WebRTC-compliant video frame container package 518 is a VP8, VP9, or H264 codec header.

In some embodiments, the unpackaging of the WebRTC-compliant video frame container package may further comprise discarding a WebRTC-compliant codec ender and an unencrypted pixel from the WebRTC-compliant video frame container package. For instance, the unpacker 144a of the client computing device 140 unpackaging or unwrapping the WebRTC-compliant video frame container package 518 by further discarding a WebRTC-compliant codec ender (e.g., VP8 codex ender) and an unencrypted pixel from the WebRTC-compliant video frame container package 518.

In some embodiments, the encrypted video component and the encrypted corresponding audio component to be decrypted were encrypted via cipher block chaining mode (CBC), counter mode (CTR), or CBC in the CENC (CBCS).

Figure 9:
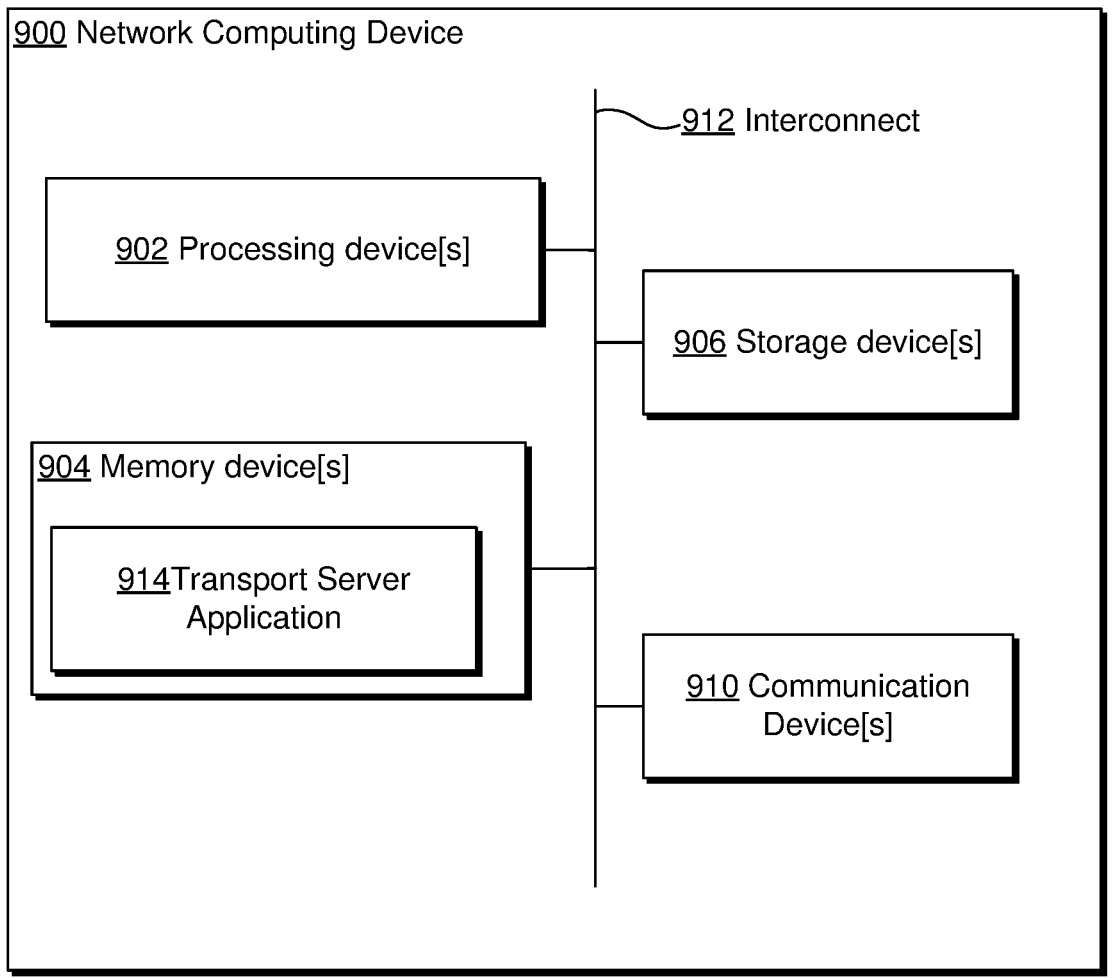
FIG. 9 is a high-level block diagram of an example network computing device 900 according to some example embodiments.

FIG. 9 is a high-level block diagram of an example network computing device 900 in accordance with some example embodiments. In various embodiments, one or more of the network computing devices 900 may be employed to implement the WebRTC server system 14 of FIG. 1 or the WebRTC server system 114 of FIG. 4. More particularly, one or multiple instances of the network computing devices 900 can be used to implement the technologies described herein, where multiple such instances can be coupled to each other via one or more networks.

As illustrated, the computing device 900 includes one or more processing devices 902, one or more memory devices 904, one or more storage devices 906, and one or more communication devices 910, all coupled together via an interconnect 912. The one or more memory devices 904 may store therein a transport server application 914 (e.g., computer readable instructions) for implementing the transport server module 16 of FIG. 1, or the transport server module 116 of FIG. 4 described above as well as other applications such as, for example, an operating system (OS). That is, in various embodiments, at least some of the processes and logic flows described above can be performed by the one or more processing devices 902 executing one or more computer programs (e.g., transport server application 914). For example, when the transport server module 16 of FIG. 1, or the transport server module 116 of FIG. 4 is implemented at least partly via a computer program rather than via dedicated circuits such as ASIC for example, the computer program (e.g., transport server application 914), which may be loaded on the one or more memory devices 904, may be executed by the one or more processing devices 902 in order to execute the above-described techniques. Note that although not explicitly illustrated in FIG. 9, a persistent copy of the transport server application 914 may be stored in one or more storage devices 906.

The interconnect 912 may be or include one or more conductive traces, buses, point-to-point connections, controllers, adapters, and/or other connection devices. The one or more processing devices 902 may include, for example, one or more processors, digital signal processors (DSPs), controllers, field programmable gate array (FPGA), application specific integrated circuit (ASIC), or the like, or any combination thereof. The one or more memory devices 904 may include one or more physical storage devices, which may be in the form of random-access memory (RAM), Static RAM (SRAM), Dynamic RAM (DRAM), read-only memory (ROM), flash memory, or other suitable type of storage or memory device, or a combination of such devices. The one or more storage devices 906 may include one or more hard drives, solid-state drives, digital versatile disks (DVDs), flash memories, datastore, or the like. Each of the memory device[s] 904 and/or storage device[s] 906 may store, individually or collectively, data and instructions that configure the one or more processing devices 902 to execute operations to implement some of the processes and operations described above.

The one or more communication devices 910 may include, for example, a network interface card (NIC), an Ethernet adapter, cable modem, Wi-Fi adapter, cellular transceiver, baseband processor, or the like, or a combination thereof.

After reviewing the present disclosure, an individual of ordinary skill in the art will immediately appreciate that some details and features can be added, removed and/or changed without deviating from the spirit of the invention. Reference throughout this specification to "one embodiment," "an embodiment," "additional embodiment(s)" or "some embodiments," means that a particular feature, structure or characteristic described in connection with the embodiment(s) is included in at least one or some embodiment(s), but not necessarily all embodiments, such that the references do not necessarily refer to the same embodiment (s). Furthermore, the particular features, steps, structures, or characteristics may be combined in any suitable manner in one or more embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

What is claimed is:

1. A computer-implemented method comprising:

acquiring, by a Web Real-Time Communication (WebRTC) server system, a digital rights management (DRM)-protected media content frame;

packaging, by the Web Real-Time Communication (WebRTC) server system, the DRM-protected media content frame to disguise the DRM-protected media content frame as a WebRTC-compliant video frame by including the DRM-protected media content frame as a payload for a WebRTC-compliant video frame container that includes a WebRTC-compliant coder and decoder (codec) header to produce a WebRTC-compliant video frame container package; and transmitting through a WebRTC video channel, by the WebRTC server system, the WebRTC-compliant video frame container package.

2. The computer-implemented method of claim 1, wherein the DRM-protected media content frame to be acquired and included as the payload for the WebRTC-compliant video frame container includes an encrypted video component and an encrypted corresponding audio component of a DRM-protected video frame.

3. The computer-implemented method of claim 2, wherein acquiring the DRM-protected media content frame comprises:

receiving, by the WebRTC server system, a video component and a corresponding audio component of a video frame;

encrypting, by the WebRTC server system, the video component and the corresponding audio component; and multiplexing, by the WebRTC server system, the encrypted video component and the encrypted corresponding audio component to generate the DRM-protected media content frame.

4. The computer-implemented method of claim 3, wherein the video component and the corresponding audio component of a video frame are received via WebRTC-HTTP ingestion protocol (WHIP).

5. The computer-implemented method of claim 2, wherein acquiring the DRM-protected media content frame comprises:

receiving, by the WebRTC server system, an encrypted video component and an encrypted corresponding audio component of an encrypted video frame; and multiplexing, by the WebRTC server system, the encrypted video component and the encrypted corresponding audio component to generate the DRM-protected media content frame.

6. The computer-implemented method of claim 5, wherein the encrypted video component and the encrypted corresponding audio component are received via WebRTC-HTTP ingestion protocol (WHIP).

7. The computer-implemented method of claim 1, wherein the DRM-protected media content frame to be acquired is encrypted with a DRM encryption scheme.

8. The computer-implemented method of claim 7, wherein the DRM encryption scheme is cipher block chaining mode (CBC), counter mode (CTR), or CBC in the CENC (CBCS).

9. The computer-implemented method of claim 1, wherein packaging the DRM-protected media content frame comprises including an encrypted pixel in the payload for the WebRTC-compliant video frame container.

10. The computer-implemented method of claim 1, wherein packaging the DRM-protected media content frame to produce the WebRTC-compliant video frame container package comprises including in the WebRTC-compliant video frame container package a WebRTC-compliant codec ender.

11. The computer-implemented method of claim 10, wherein the WebRTC-compliant codec header of the WebRTC-compliant video frame container package to be produced is a VP8 codec header.

12. The computer-implemented method of claim 10, wherein the WebRTC-compliant codec header of the WebRTC-compliant video frame container package to be produced is a VP9 or H264 codec header.

13. The computer-implemented method of claim 1, wherein transmitting through a WebRTC video channel, by the WebRTC server system, the WebRTC-compliant video frame container package includes transmitting the WebRTC-compliant video frame container package via WebRTC-HTTP egress protocol (WHEP).

14. One or more non-transitory computer-readable storage media including instructions that, when executed by one or more processors of a computing device, cause the one or more processors to perform the steps of:

receive from a Web Real-Time Communication (WebRTC) video channel a WebRTC-compliant video frame container package that includes a WebRTC-compliant coder and decoder (codec) header and a digital rights management (DRM)-protected media content frame comprising multiplexed encrypted video component and corresponding encrypted audio component;

unpackage the WebRTC-compliant video frame container package by discarding at least the WebRTC-compliant codec header to output a DRM-protected media content frame containing the multiplexed encrypted video component and encrypted corresponding audio component;

demultiplex the multiplexed encrypted video component and the encrypted corresponding audio component to output an encrypted video component and a corresponding audio component; and decrypt the encrypted video component and the encrypted corresponding audio component.

15. The one or more non-transitory computer-readable storage media of claim 14, wherein the WebRTC-compliant video frame container package is received via WebRTC-HTTP egress protocol (WHEP).

16. The one or more non-transitory computer-readable storage media of claim 14, wherein receiving from the WebRTC video channel the WebRTC-compliant video frame container package comprises communicating with a WebRTC server system to initiate the WebRTC data channel prior to receiving the WebRTC-compliant video frame container package.

17. The one or more non-transitory computer-readable storage media of claim 14, wherein the WebRTC-compliant codec header of the received WebRTC-compliant video frame container package is a VP8, VP9, or H264 codec header.

18. The one or more non-transitory computer-readable storage media of claim 14, wherein unpackaging the WebRTC-compliant video frame container package further comprises discarding a WebRTC-compliant codec ender and a pixel from the WebRTC-compliant video frame container package.

19. The one or more non-transitory computer-readable storage media of claim 14, wherein the encrypted video component and the encrypted corresponding audio component to be decrypted were encrypted via cipher block chaining mode (CBC), counter mode (CTR), or CBC in the CENC (CBCS).

20. One or more non-transitory computer-readable storage media including instructions that, when executed by one or more processors of a Web Real-Time Communication (WebRTC) server system, cause the one or more processors to perform the steps of:

acquire a digital rights management (DRM)-protected media content frame;

package the DRM-protected media content frame to disguise the DRM-protected media content frame as a WebRTC-compliant video frame by including the DRM-protected media content frame as a payload for a WebRTC-compliant video frame container that includes a WebRTC-compliant coder and decoder (codec) header to produce a WebRTC-compliant video frame container package; and transmit through a WebRTC video channel the WebRTC-compliant video frame container package.

* * * * *